(12) United States Patent
Yagyu et al.

(10) Patent No.: US 11,963,474 B2
(45) Date of Patent: Apr. 23, 2024

(54) SPREADER DEVICE

(71) Applicant: KUBOTA CORPORATION, Osaka (JP)

(72) Inventors: Sumio Yagyu, Osaka (JP); Takao Nakagawa, Osaka (JP); Masaru Kawane, Osaka (JP); Piet Jan Van Der Marel, Nieuw-Vennep (NL)

(73) Assignee: KUBOTA CORPORATION, Osaka (JP)

( * ) Notice: Subject to any disclaimer, the term of this patent is extended or adjusted under 35 U.S.C. 154(b) by 1096 days.

(21) Appl. No.: 16/728,025

(22) Filed: Dec. 27, 2019

(65) Prior Publication Data

US 2020/0146209 A1    May 14, 2020

Related U.S. Application Data

(63) Continuation of application No. PCT/JP2018/019384, filed on May 18, 2018.

(30) Foreign Application Priority Data

Jun. 28, 2017  (JP) .................................. 2017-126724

(51) Int. Cl.
  *A01C 19/02*   (2006.01)
  *A01C 17/00*   (2006.01)
  *A01C 15/00*   (2006.01)

(52) U.S. Cl.
  CPC ............ *A01C 19/02* (2013.01); *A01C 17/005* (2013.01); *A01C 15/006* (2013.01); *A01C 15/008* (2013.01)

(58) Field of Classification Search
  CPC ............... A01C 17/005; A01C 19/02
  (Continued)

(56) References Cited

U.S. PATENT DOCUMENTS

| 2,296,909 A * | 9/1942 | Dake .................... A01C 15/005 222/413 |
| 3,539,113 A * | 11/1970 | Tyler .................... A01C 17/001 239/667 |
| 2018/0235143 A1* | 8/2018 | Zeitvogel ............. A01C 19/045 |

FOREIGN PATENT DOCUMENTS

| DE | 199 29 356 A1 | 1/2000 |
| DE | 10 2009 025 743 A1 | 11/2010 |

(Continued)

OTHER PUBLICATIONS

Extended European Search Report issued in the corresponding European Patent Application No. 18824017.0 dated Feb. 24, 2021.

(Continued)

*Primary Examiner* — Cody J Lieuwen
(74) *Attorney, Agent, or Firm* — Greenblum & Bernstein, P.L.C.

(57) ABSTRACT

A spreader device includes a container to contain spread substance, a first spreader portion having a first rotor to spray the spread substance contained in the container, a second spreader portion having a second rotor to spray the spread substance contained in the container, a first driver source to drive the first rotor, a first shaft to transmit a driving force outputted from the first driver source, a second shaft to transmit a driving force outputted from a second driver source different from the first driver source, and a selection transmitter portion to selectively transmit the driving force form the first shaft and the driving force from the second shaft to the first rotor or the second rotor.

7 Claims, 11 Drawing Sheets

(58) Field of Classification Search
USPC .................................. 239/661, 670, 682, 687
See application file for complete search history.

(56) References Cited

FOREIGN PATENT DOCUMENTS

| | | |
|---|---|---|
| DE | 10 2015 011 949 A1 | 3/2017 |
| EP | 1 825 739 A1 | 8/2007 |
| EP | 1825739 A1 * | 8/2007 ........... A01C 17/005 |
| JP | S59-106211 A | 6/1984 |
| JP | 2007-312705 A | 12/2007 |
| JP | 2013-243982 A | 12/2013 |
| JP | 2014-093976 A | 5/2014 |

OTHER PUBLICATIONS

International Search Report issued in International Patent Application No. PCT/JP2018/019384, dated Jul. 24, 2018.

\* cited by examiner

FIG.6

|    | A    | B    | C     |
|----|------|------|-------|
| SB | 0    | 600  | 1000  |
| AB | 1000 | 1000 | 1000  |
| C  | -500 | 400  | 1000  |
| SA | 0    | 600  | 1000  |
| AA | 1000 | 1000 | 1000  |
| B1 | 0    | -672 | -1120 |
| B2 | 1120 | 1120 | 1120  |

FIG.7

|  | D | E |
|---|---|---|
| SB | 1333 | 1135 |
| AB | 1000 | 1000 |
| C | 1500 | 1203 |
| SA | 1000 | 1000 |
| AA | 0 | 600 |
| B1 | −1120 | −1120 |
| B2 | 0 | 672 |

SPREADER DEVICE

CROSS-REFERENCE TO RELATED APPLICATIONS

The present application is a continuation application of International Application No. PCT/JP2018/019384, filed May 18, 2018, which claims priority to Japanese Patent Application No. 2017/126724, filed Jun. 28, 2017. The contents of these applications are incorporated herein by reference in their entirety.

BACKGROUND OF THE INVENTION

Field of the Invention

The present invention relates to a spreader device configured to spray a spread substance such as fertilizer on an agricultural field or the like.

Description of Related Art

The spreader device disclosed by Japanese Unexamined Patent Application Publication No. S59-106211 is previously known.

The spreader device disclosed in Japanese Unexamined Patent Application Publication No. S59-106211 includes a container portion arranged to the rear of a traveling vehicle (a tractor) and configured to contain a spread substance such as fertilizer, and includes two rotors (horizontally-spreading rotor plates) that spray the spread substance contained in the container portion. The two rotors are driven by a driving force taken out from a PTO shaft provided in the traveling vehicle.

SUMMARY OF THE INVENTION

A spreader device according to one aspect of the present invention, includes: a container to contain spread substance; a first spreader portion having a first rotor to spray the spread substance contained in the container; a second spreader portion having a second rotor to spray the spread substance contained in the container; a first driver source to drive the first rotor; a first shaft to transmit a driving force outputted from the first driver source; a second shaft to transmit a driving force outputted from a second driver source different from the first driver source; and a selection transmitter portion to selectively transmit the driving force form the first shaft and the driving force from the second shaft to the first rotor or the second rotor.

A spreader device according to another aspect of the present invention, includes: a container to contain spread substance; a first spreader portion having a first rotor to spray the spread substance contained in the container; a second spreader portion having a second rotor to spray the spread substance contained in the container; a first transmission portion to transmit the driving force to the first rotor; and a second transmission portion to transmit the driving force to the second rotor. The first transmission portion or the second transmission portion has a speed shifting portion including a driver source to applies a rotating force to a path for transmitting the driving force to the first rotor or the second rotor to change a rotating speed of the first rotor or the second rotor, the speed-shifting portion including: a first speed-shifting portion provided in the first transmission portion; and a second speed-shifting portion provided in the second transmission portion. The driver source includes: a first motor included in the first speed-shifting portion; and a second motor included in the second speed-shifting portion.

DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 6 is a view illustrating a list representing one example of relation between a first driver source, a second driver source, a first rotor, a second rotor, a third transmission shaft, a fourth transmission shaft, and a rotating speed of an inner gear according to the first embodiment;

FIG. 7 is a view illustrating a list representing another example of relation between the first driver source, the second driver source, the first rotor, the second rotor, the third transmission shaft, the fourth transmission shaft, and the rotating speed of the inner gear according to the first embodiment;

DESCRIPTION OF THE EMBODIMENTS

Figure 1:
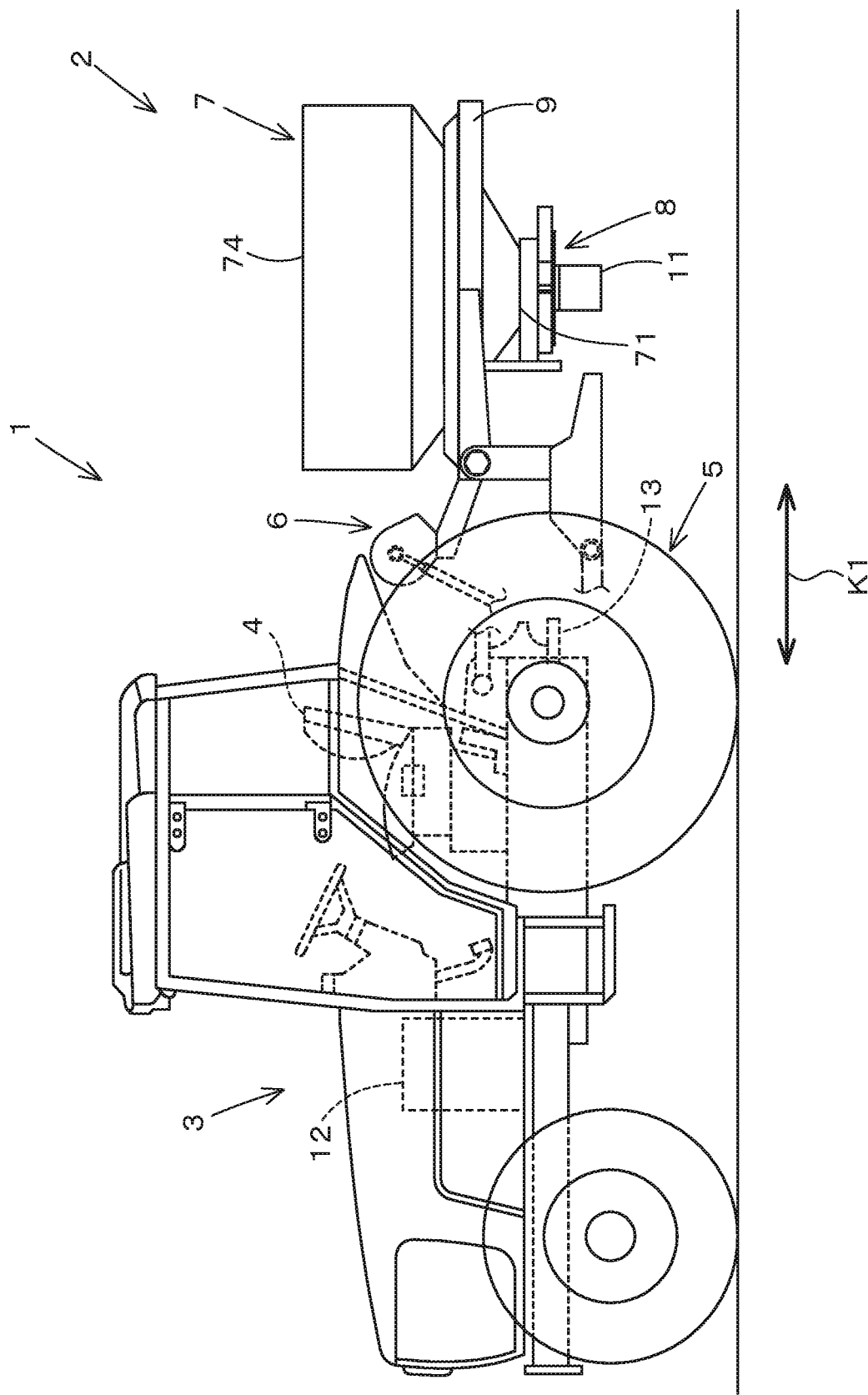
FIG. 1 is a side view of a spreader machine according to embodiments of the present invention.

The embodiments will now be described with reference to the accompanying drawings, wherein like reference numerals designate corresponding or identical elements throughout the various drawings. The drawings are to be viewed in an orientation in which the reference numerals are viewed correctly.

Hereinafter, an embodiment of the present invention will be described below with reference to the drawings as appropriate.

Hereinafter, embodiments of the present invention will be described with reference to the drawings.

Figure 2:
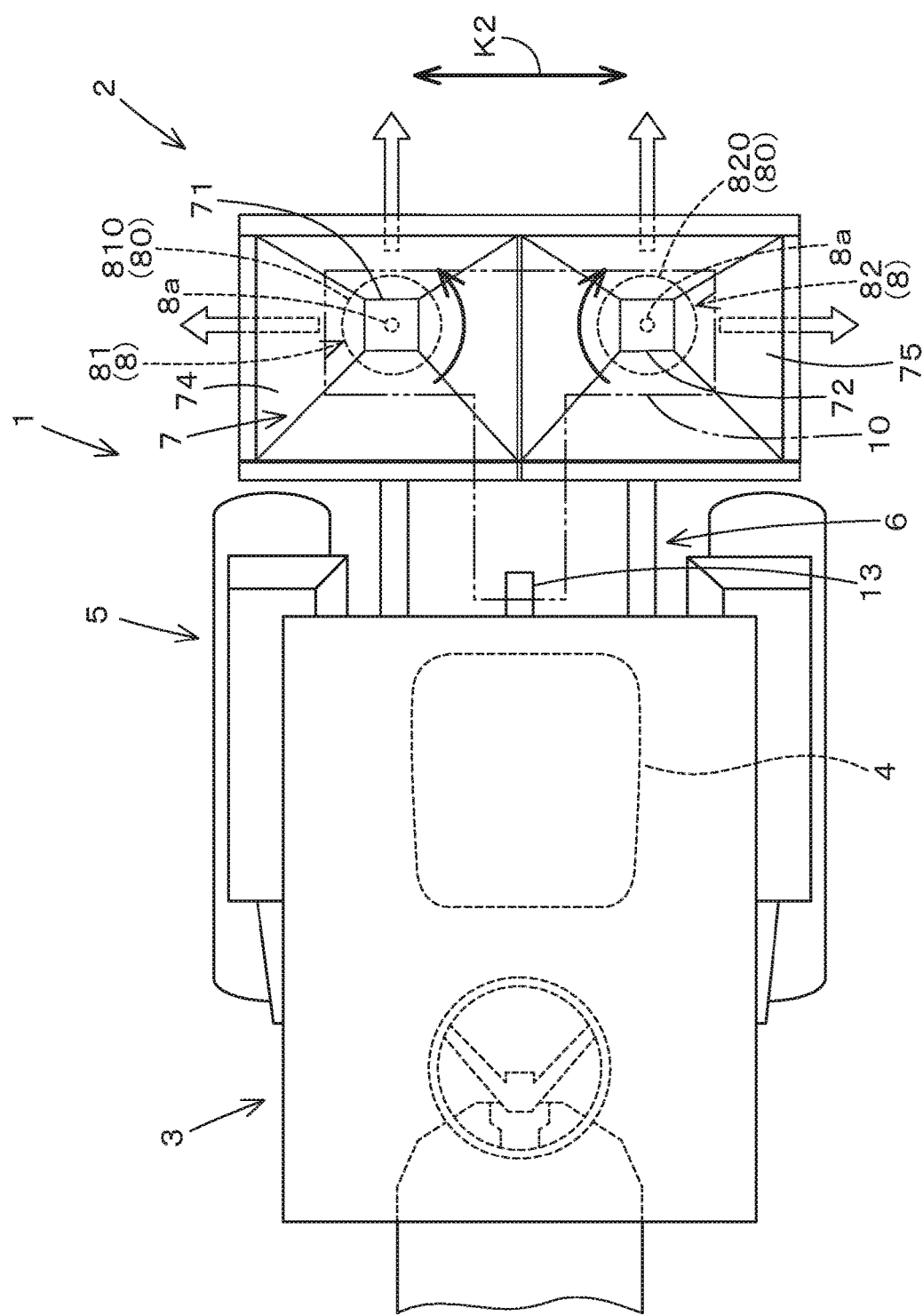
FIG. 2 is a planar view of the spreader machine according to the embodiments.

FIG. 1 and FIG. 2 show a spreader machine 1 provided with a spreader device 2 according to an embodiment of the present invention. The spreader machine 1 includes the spreader device 2 and a traveling vehicle 3.

The spreader device 2 sprays the spread substance such as fertilizers and chemical agents on the agricultural field (farm). The traveling vehicle 3 is a vehicle that travels while pulling the spreader device 2. Although the kind of traveling vehicle 3 is not limited, the traveling vehicle 3 is a tractor in the embodiment. The spreader device 2 may be configured to travel independently without being pulled by the traveling vehicle 3.

The tractor (the traveling vehicle) 3 includes an operator seat 4, a traveling device 5, and a coupling device 6. In the embodiment of the present invention, the front side of the operator seated on the operator seat 4 (the left side in FIG. 1) is referred to as the front, the rear side of the operator (the right side in FIG. 1) is referred to as the rear, the left side of the operator (the front surface side of FIG. 1) is referred to as the left, and the right side of the operator (the back surface side of FIG. 1) is referred to as the right. In addition, the horizontal direction K2 (see FIG. 2), which is a direction orthogonal to the front-rear direction K1 (see FIG. 1), will be described as the machine width direction.

Furthermore, the tractor 3 includes an internal combustion engine 12 and a PTO shaft 13 that outputs a rotational driving force (a driving force) from the internal combustion engine 12. In the present embodiment, the internal combustion engine 12 is an engine, preferably is a diesel engine.

The rotating speed of the PTO shaft 13 may be constant, or the rotating speed may be changed to a plurality of steps (2 steps, 3 steps or more). The "rotating speed" is the number of rotations per unit time, and is also referred to as a "rotating number". The rotating speed is expressed, for example, in units (rpm).

In the present embodiment, the traveling device 5 is a four-wheel driving type composed of front wheels and rear wheels, but may be a crawler type traveling device.

The coupling device 6 is provided at the rear portion of the tractor 3. The coupling device 6 is composed of a three-point link mechanism or the like. The spreader device 2 is detachably coupled to the coupling device 6.

Hereinafter, the spreader device 2 will be described.

As shown in FIG. 1 to FIG. 4, the spreader device 2 includes a container portion 7 and a spreader portion 8.

The container portion 7 contains the spread substance to be spread on the agricultural field.

As shown in FIG. 1 to FIG. 4, the container portion 7 is constituted of a substantially inverted pyramid-shaped hopper.

The container portion 7 has an charging inlet for the spread substance at the upper end portion and has an outlet for taking out the spread substance contained at the lower end portion. In the present embodiment, the number of outlets is determined according to the number of rotors 80 described later. In the present embodiment, the number of rotors 80 is two, and thus the number of outlets is also two. Hereinafter, for convenience of the explanation, the two outlets are respectively referred to as a first outlet port 71 and a second outlet port 72. However, the number of outlets may be different from the number of rotors 80. For example, one outlet may be provided for a plurality of rotors 80. In this case, the spread substance taken out from one outlet is distributed and supplied to each of the plurality of rotors 80.

The hopper constituting the container portion 7 may be a hopper provided with a plurality of outlets (one charging inlet and a plurality of outlets), may be a plurality of hoppers each provided with an outlet, or may be a plurality of hoppers with which only one outlet is provided (a plurality of charging inlets and one outlet).

For example, when the number of outlets is two, two outlets may be provided in one hopper, or two hoppers having one outlet may be provided. In addition, when the number of outlets is one, for example, one outlet shared with two hoppers may be provided.

In the present embodiment, the container portion 7 is provided with two hoppers each having the outlet (two charging inlets and two outlets). That is, the container portion 7 includes a first hopper 74 having a first outlet port 71 and a second hopper 75 having a second outlet port 72. In this manner, different spread substances are contained in the first hopper 74 and the second hopper 75, and different spread substances can be taken out separately from the outlet ports (the first outlet port 71 and the second outlet port 72) and then can be spread separately.

Figure 3:
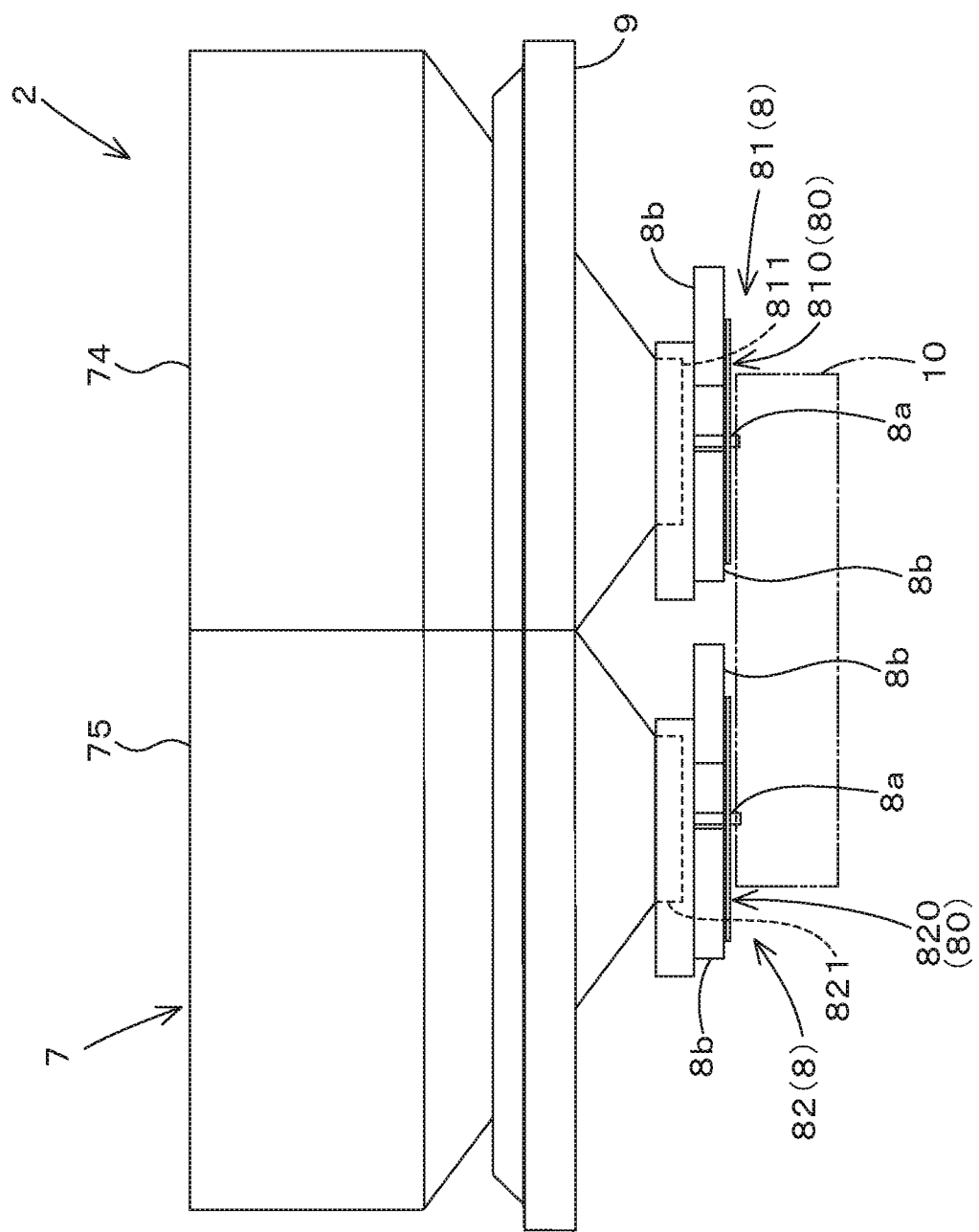
FIG. 3 is a back view of a spreader device according to the embodiments.

The spreader portion 8 spreads the spread substance contained in the container portion 7. As shown in FIG. 1, FIG. 3, and the like, the spreader portion 8 is provided below the container portion 7.

The spreader portion 8 includes at least two or more spreader portions having different spreading directions.

Figure 4:
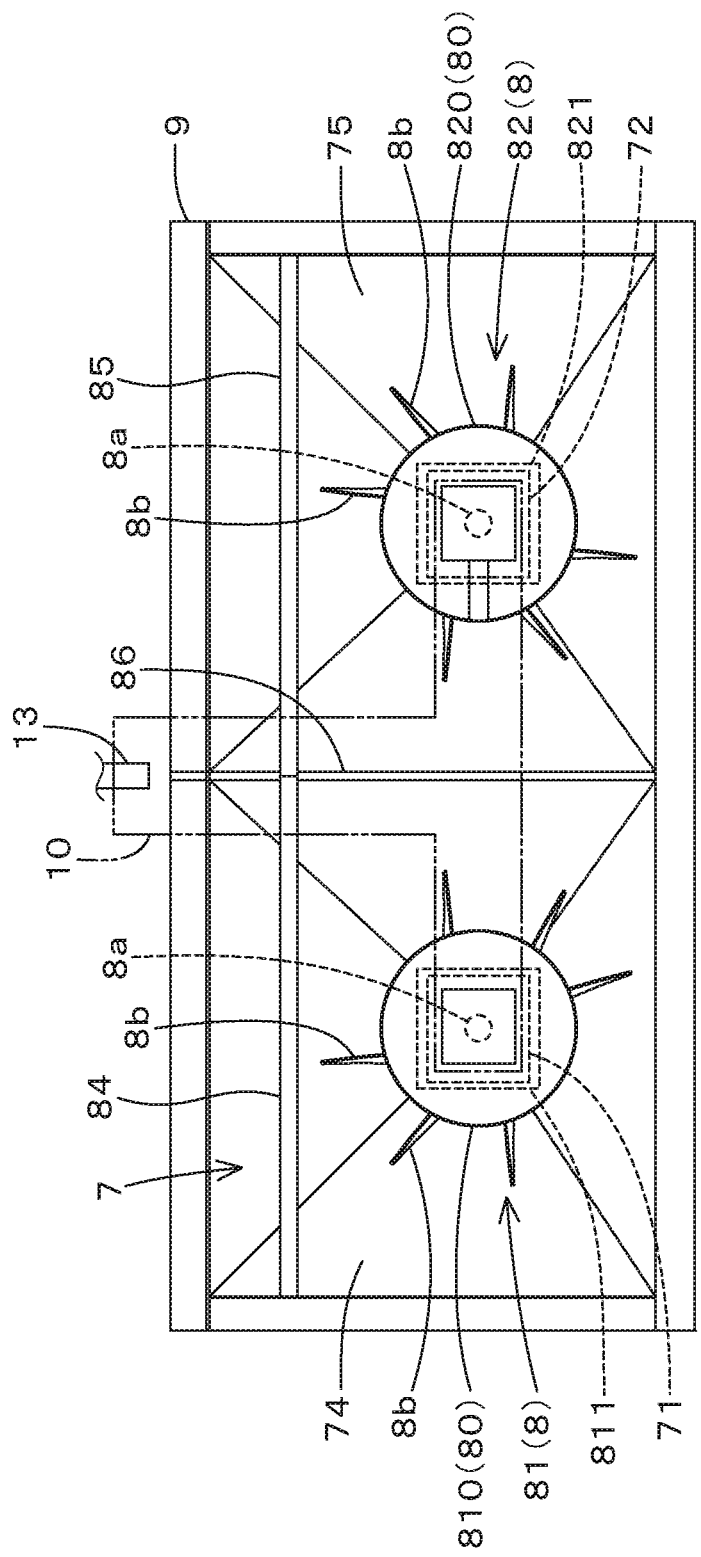
FIG. 4 is a bottom view of the spreader device according to the embodiments.

As shown in FIG. 2 and FIG. 4, the spreader portion 8 includes a first spreader portion 81 and a second spreader portion 82. That is, in the present embodiment, the number of the spreader portions 8 is two. However, the number of spreader portions 8 is not limited to two, and may be three or more. The number of the spreader portions 8 and the number of the rotors 80 are the same.

As shown in FIG. 2 and FIG. 4, the first spreader portion 81 and the second spreader portion 82 are provided side by side in the width direction of the traveling vehicle 3 (the machine width direction). Hereinafter, the two spreader portions (the first spreader portion 81 and the second spreader portion 82) will be described.

As shown in FIG. 3 and FIG. 4, the first spreader portion 81 includes a first rotor 810 and a first shutter device 811.

The first rotor 810 has a disk shape and rotates around a center axis 8a extending in the perpendicular direction (in the vertical direction). A plurality of blade members 8b are attached to the upper surface of the first rotor 810. The plurality of blade members 8b are arranged at intervals in the circumferential direction, and extend in the radially outward direction from the vicinity of the center shaft 8a. The first rotor 810 rotates around the center axis 8a, so that the spread substance that has fallen from the first outlet port 71 is hit by the blade member 8b and is spread outward (in a radially-outward direction).

The first shutter device 811 has a shutter and an electric motor (not shown in the drawing). The shutter is attached to the first outlet port 71 of the container portion 7, and the area (an opening aperture) of the first outlet port 71 can be changed by the movement of the shutter. The electric motor is a stepping motor or the like, and is connected to the shutter. The first shutter device 811 drives the electric motor to move the shutter, and thereby changes the opening aperture of the first outlet port 71. In this manner, the spreading amount of the spread substance by the first spreader portion 81 is adjusted.

As shown in FIG. 4, the second spreader portion 82 includes a second rotor 820 and a second shutter device 821. Since the configuration of the second rotator 820 is the same as that of the first rotator 810, the description thereof is omitted.

The configuration of the second shutter device 821 is the same as that of the first shutter device except that the shutter is attached to the second outlet port 72. The second shutter device 821 can adjust the spreading amount of the spread substance by the second spreader portion 82 by changing the opening aperture of the second outlet port 72.

As shown in FIG. 2 and FIG. 4, the first rotor 810 and the second rotor 820 are provided side by side in the width direction of the traveling vehicle 3 (in the machine width direction). In other words, the first rotor 810 and the second rotor 820 are arranged at the same position in the front-rear direction, and are arranged at different positions in the machine width direction.

As shown in FIG. 2, the first rotator 810 and the second rotator 820 rotate in different directions. In the present embodiment, as shown by the black arrowed line in FIG. 2, the first rotor 810 rotates counterclockwise and the second rotor 820 rotates clockwise in planar view.

The first rotor 810 is arranged below the first outlet port 71 of the container portion 7. The spread substance that has fallen from the first outlet port 71 is spread by the first rotor 810 that is rotating. The second rotor 820 is arranged below the second outlet port 72 of the container portion 7. The spread substance that has fallen from the second outlet port 72 is spread by the second rotor 820 that is rotating.

The spreading directions of the first spreader portion 81 and the second spreader portion 82 are different from each other. The spreading direction of the first spreader portion 81 is one side in the machine width direction and the rear. The spreading direction of the second spreader portion 82 is the other side in the machine width direction and the rear. As shown by the white arrowed line in FIG. 2, in the present embodiment, the spreading direction of the first spreader portion 81 is the right and the rear right, and the spreading direction of the second spreader portion 82 is the left and the rear left. In addition, the direction shown by the white arrowed line is the main spreading direction, and actually performs the spreading in a fan shape including the direction shown by the white arrowed line.

As shown in FIG. 4, the spreader portion 8 has a regulator plate that regulates the spreading directions of the first spreader portion 81 and the second spreader portion 82. The regulator plate includes a first regulator plate 84, a second regulator plate 85, and a third regulator plate 86. Each regulator plate can be attached to a frame 9 or the like which will be described later.

The first regulator plate 84 is provided in front of the first rotor 810, and extends in the machine width direction. The first regulator plate 84 restricts (prevents) that the spread substance is scattered forward by the rotation of the first rotor 810. The second regulator plate 85 is provided in front of the second rotor 820, and extends in the machine width direction. The second regulator plate 85 restricts the spread substance from being scattered forward by the rotation of the second rotor 820. The third regulator plate 86 is provided between the first rotor 810 and the second rotor 820, and extends in the front-rear direction. The third regulator plate 86 restricts the spread substance from being scattered to the left by the rotation of the first rotor 810 and restricts the spread substance from being scattered to the right by the rotation of the second rotor 820.

Thereby, the spreading direction by rotation of the first rotor 810 is controlled by the first control board 84 and the third control board 86, and is mainly the right and the rear right. The spreading direction due to the rotation of the second rotor 820 is regulated by the second regulator plate 85 and the third regulator plate 86, and is mainly the left and the rear left.

Any configuration (the position, the number, the shape, the attachment structure, and the like) of the regulator plate is possible as long as it can regulate the spreading directions of the first spreader portion 81 and the second spreader portion 82 in desired directions. And, the configuration is not limited to the configuration shown in FIG. 4.

As described above, the first spreader portion 81 and the second spreader portion 82 are responsible for spreading in different directions. In this manner, uniform spreading to an agricultural field can be performed easily. In addition, by making the rotating speeds of the first rotor 810 and the second rotor 820 different, the spreading distance to one side of the tractor 3 in the machine width direction and the spreading distance to the other side can be made different. In this manner, appropriate spreading is facilitated according to the shape of the agricultural field and the traveling position of the tractor 3.

As shown in FIG. 1, FIG. 3, and FIG. 4, the spreader device 2 includes a frame (attachment portion) 9. As shown in FIG. 1, the frame 9 supports the container portion 7, the spreader portion 8, and the first driver source 11.

As shown in FIG. 3 and FIG. 4, the frame 9 is attached around the hopper constituting the container portion 7. In particular, the frame 9 is attached so as to surround the first hopper 74 and the second hopper 75. In this manner, the hopper which constitutes the container portion 7 is supported by the frame 9.

A support member (not shown in the drawings) is attached to the lower portion of the frame 9, and the support member supports the driver portion 10 including the first driver source 11, the spreader portion 8, and the like are supported below the container portion 7.

As shown in FIG. 1 and FIG. 2, the front portion of the frame 9 is connected to the coupling device 6 provided at the rear portion of the tractor 3. In this manner, the spreader device 2 supported by the frame 9 is detachably attached to the rear portion of the tractor 3.

Note that the configurations (the shape and the like) of the frame 9 is not limited to the configurations shown in FIG. 3 and FIG. 4. Any configuration configured to support the container portion 7 and the spreader portion 8 and to be coupled to the coupling device 6 may be employed.

As shown in FIG. 2 to FIG. 4, the spreader device 2 includes the driver portion 10.

The driver portion 10 can be supported by the frame 9, for example.

The driver portion 10 according to two embodiments (a first embodiment and a second embodiment of the present invention) will be described below.

First Embodiment of Driver Portion

First, the driver portion 10 according to the first embodiment of the present invention will be described with reference to FIG. 5.

Figure 5:
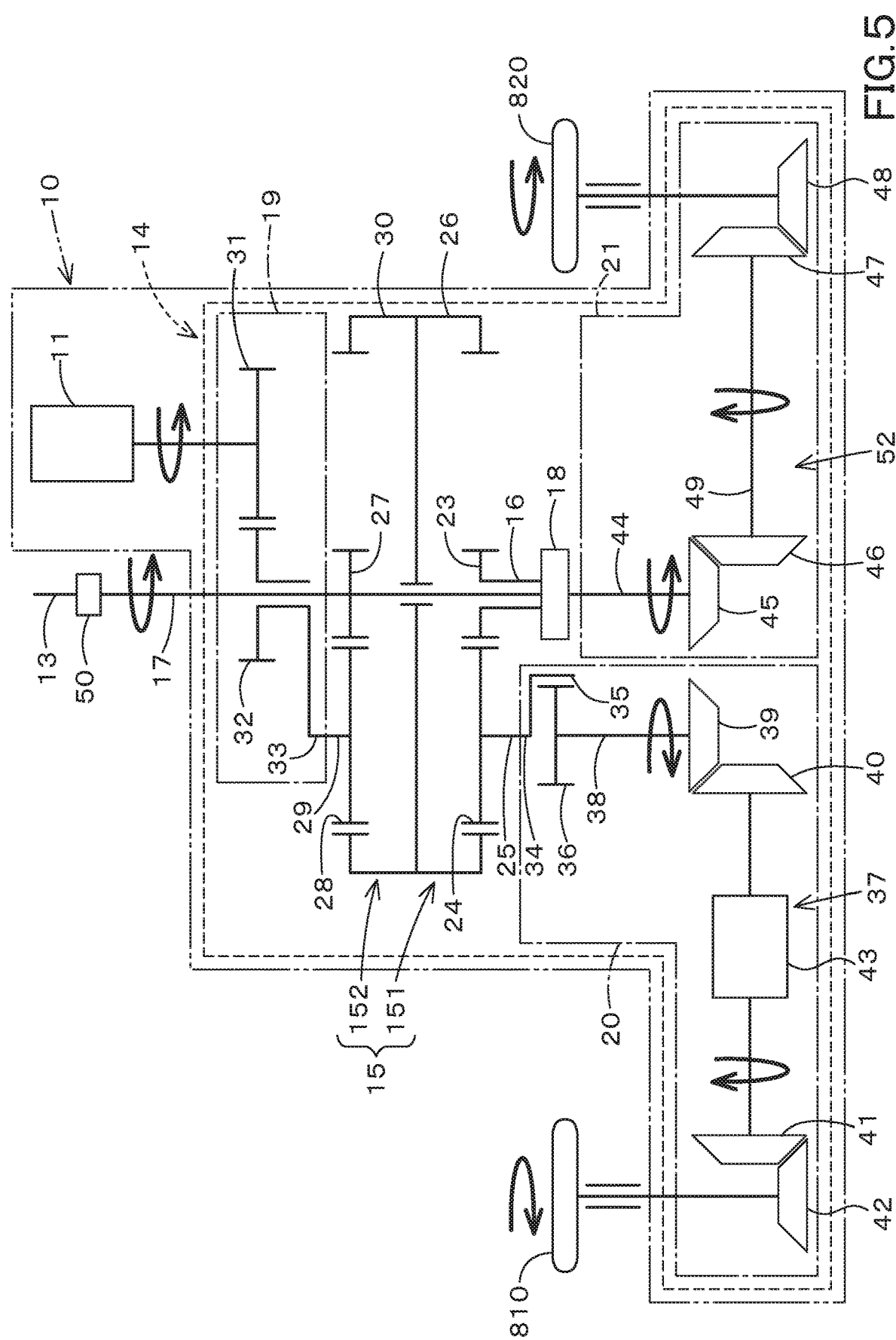
FIG. 5 is a view showing a driver portion according to a first embodiment of the present invention.

As shown in FIG. 5, the driver portion 10 includes a first driver source 11 and a driving-force transmission mechanism 14.

The first driver source 11 is a driver source configured to shift the speed. In particular, the first driver source 11 is a motor. In the present embodiment, the first driver source 11 is an electric motor.

The first driver source 11 is a driver source which drives the rotor of spreader portion 8 (the first rotor 810 and the second rotor 820). On the other hand, an internal combustion engine (hereinafter referred to as "second driver source") 12 provided in the tractor 3 is also a driver source for driving the rotors (the first rotor 810 and the second rotor 820) of the spreader portion 8. That is, the first driver source 11 and the second driver source 12 can both drive the first rotator 810 and the second rotator 820. The relation between the driving of the rotors (the first rotor 810 and the second rotor 820) and the driver sources (the first driving source 11 and the second driving source 12) used for the driving will be described in detail later.

The driving-force transmission mechanism 14 is a mechanism configured to transmit the driving force of the first driver source 11 and the driving force of the second driver source 12 to the first rotor 810 and the second rotor 820. In particular, the driving-force transmission mechanism 14 can selectively transmit the driving force of the first driver source 11 or the second driver source 12 to the first rotor 810. The driving-force transmission mechanism 14 is configured to selectively transmit the driving force of the first driver source 11 or the second driver source 12 to the second rotor 820.

As shown in FIG. 5, the driving-force transmission mechanism 14 has a combined planetary gear mechanism 15.

The combined planetary gear mechanism 15 has a first planetary gear mechanism 151 and a second planetary gear mechanism 152.

The first planetary gear mechanism 151 has a first sun gear 23, a first planetary gear 24, a first planetary carrier 25, and a first inner gear 26.

The first sun gear 23 is engaged with the first planetary gear 24. The first planetary gear 24 is rotatably supported by the first planetary carrier 25, and can rotate (revolve) around the first sun gear 23. The first planetary carrier 25 rotates in synchronization with the rotation (revolving) of the first planetary gear 24. The first inner gear 26 is engaged with the first planetary gear 24.

The second planetary gear mechanism 152 includes a second sun gear 27, a second planetary gear 28, a second planetary carrier 29, and a second inner gear 30.

The second sun gear 27 is engaged with the second planetary gear 28. The second planetary gear 28 is rotatably supported by the second planetary carrier 29, and can rotate (revolve) around the second sun gear 27. The second planetary carrier 29 rotates in synchronization with the rotation (revolving) of the second planetary gear 28. The second inner gear 30 is engaged with the second planetary gear 28.

The second sun gear 27 has the same shape as the shape of the first sun gear 23. The second planetary gear 28 has the same shape as the shape of the first planetary gear 24. The second inner gear 30 is coupled to the first inner gear 26, and rotates integrally with the first inner gear 26. The first inner gear 26 and the second inner gear 30 have the same shapes, and can rotate around an identical center axis (the second axis 17 in the present embodiment). The first inner gear 26 and the second inner gear 30 may be a combination of two inner gears, or may be formed of the teeth constituting the first inner gear 26 and the teeth constituting the second inner gear 30 that are integrally formed on an inner surface of one annular body.

The gear ratio of the first planetary gear mechanism 151 and the gear ratio of the second planetary gear mechanism 152 are set to be equal. In the present embodiment, the gear ratio of the first planetary gear mechanism 151 and the gear ratio of the second planetary gear mechanism 152 are both set to be one-third. The gear ratio (a reduction ratio) of the first planetary gear mechanism 151 is expressed by $Z1/(Z1+Z2)$, where $Z1$ is the number of teeth of the first sun gear 23 and $Z2$ is the number of teeth of the first inner gear 26. The gear ratio (a reduction ratio) of the second planetary gear mechanism 152 is expressed by $Z3/(Z3+Z4)$, where $Z3$ is the number of teeth of the second sun gear 45 and $Z4$ is the number of teeth of the second inner gear 30.

As shown in FIG. 5, the driving-force transmission mechanism 14 has a first shaft 16.

The first shaft 16 is a shaft that transmits the driving force from the first driver source 11. In particular, the driving force from the first driver source 11 is transmitted to the first shaft 16 through the first driving-force transmission portion 19 and the combined planetary gear mechanism 15.

The one end side of the first shaft 16 is connected to the first driver source 11 through the first driving-force transmission portion 19 and the combined planetary gear mechanism 15. In particular, one end side of the first shaft 16 is connected to the center of the first sun gear 23 constituting the combined planetary gear mechanism 15. In this manner, the first shaft 16 rotates in synchronization with the rotation of the first sun gear 23. The other end side of the first shaft 16 is connected to the selection transmission portion 18. In this manner, the driving force transmitted from the first driver source 11 to the first shaft 16 is inputted to the selection transmission portion 18.

As shown in FIG. 5, the driver portion 10 has a second shaft 17. The second shaft 17 is a shaft that transmits the driving force from the second driver source 12 different from the first driver source 11. In particular, the second shaft 17 transmits the driving force from the second driver source 12 to the driving-force transmission mechanism 14.

The one end side of the second shaft 17 is connected to the PTO shaft 13 by a connecting portion 50 such as a shaft coupler. In this manner, the driving force of the second driver source 12 is transmitted to the second shaft 17 through the PTO shaft 13 and the connecting portion 50. A middle portion of the second shaft 17 is connected to the center of the second sun gear 27 constituting the combined planetary gear mechanism 15. The other end side of the second shaft 17 is connected to the selection transmission portion 18. In this manner, the driving force transmitted from the second driver source 12 to the second shaft 17 is inputted to the combined planetary gear mechanism 15 and the selection transmission portion 18.

As shown in FIG. 5, the driving-force transmission mechanism 14 has a selection transmission portion 18.

The selection transmission portion 18 receives the driving force from the first shaft 16 (hereinafter referred to as a "first shaft driving force") and the driving force from the second shaft 17 (hereinafter referred to as a "second shaft driving force"). The selection transmission portion 18 can transmit the first shaft driving force and the second shaft driving force selectively to the first rotor 810 or the second rotor 820. In the present embodiment, the selection transmission portion 18 can transmit the first shaft driving force and the second shaft driving force selectively to the second rotor 820.

The selection transmission portion 18 is constituted of a clutch configured to be switched by an operation lever and the like, for example. Preferably, the selection transmission portion 18 is constituted of an electric clutch, but may be constituted of a mechanical clutch. The selection transmission portion 18 is configured to be switched between a state to be connected to the first shaft 16 (hereinafter referred to as a "first state") and a state to be connected to the second shaft 17 (hereinafter referred to as a "second state"). The selection transmission portion 18 can transmit the first shaft driving force to the second rotator 820 when switched to the first state, and can transmit the second shaft driving force to the second rotator 820 when switched to the second state.

As shown in FIG. 5, the driving-force transmission mechanism 14 has a first driving-force transmission portion 19.

The first driving-force transmission portion 19 transmits the driving force from the first driver source 11 to the combined planetary gear mechanism 15. The first driving-force transmission portion 19 includes a first gear 31, a second gear 32, and a first transmission shaft 33.

The first gear 31 is connected to the output shaft of the motor that constitutes the first driver source 11, and rotates in synchronization with the driving of the first driver source 11. The second gear 32 is engaged with the first gear 31, and rotates in the direction opposite to the first gear 31 in synchronization with the rotating of the first gear 31. The first gear 31 and the second gear 32 have the same number of teeth. The first transmission shaft 33 connects between the second gear 32 and the second planetary carrier 29, and transmits the rotating of the second gear 32 to the second planetary carrier 29. In this manner, the second planetary carrier 29 rotates (revolves) around the second sun gear 27 in synchronization with the rotating of the second gear 32.

As shown in FIG. 5, the driving-force transmission mechanism 14 has a second driving-force transmission portion 20.

The second driving-force transmission portion 20 transmits the rotational driving force outputted from the combined planetary gear mechanism 15 to the first rotor 810. The second driving-force transmission portion 20 includes a second transmission shaft 34, a third gear 35, a fourth gear 36, a first mechanism 37, and a third transmission shaft 38.

One end side of the second transmission shaft 34 is connected to the first planetary carrier 25. The other end side of the second transmission shaft 34 is connected to the third gear 35. The fourth gear 36 is engaged with the third gear 35. In this manner, the second transmission shaft 34 rotates together with the first planetary carrier 25. In addition, the third gear 35 and the fourth gear 36 rotate in synchronization with the rotating of the first planetary carrier 25.

One end side of the third transmission shaft 38 is connected to the center of the fourth gear 36. The third transmission shaft 38 rotates in synchronization with the rotating of the fourth gear 35. The rotating of the fourth gear 36 is transmitted to the first mechanism 37 through the third transmission shaft 38.

The first mechanism 37 has a gear mechanism (the fifth gear 39, the sixth gear 40, the seventh gear 41, and the eighth gear 42) and a speed governor 43. The gears constituting the first mechanism 37 (the fifth gear 39 to the eighth gear 42) are all bevel gears.

The center of the fifth gear 39 is connected to the other end side of the third transmission shaft 38. The sixth gear 40 is engaged with the fifth gear 39. The direction of the rotation axis of the sixth gear 40 intersects with the direction of the rotation axis of the fifth gear 39.

The seventh gear 41 is connected to the sixth gear 40 through the speed governor 43. The speed governor 43 regulates (shifts) the rotating of the sixth gear 40 and transmits the rotating to the seventh gear 41. The speed governor 43 is constituted of, for example, an electronic governor. The speed governor 43 can be switched between an on-state and an off-state. When the speed governor 43 is in the on-state, the speed governor 43 keeps the rotating speed of the first rotor 810 constant. The eighth gear 42 is engaged with the seventh gear 41. The direction of the rotation axis of the eighth gear 42 intersects with the direction of the rotation axis of the seventh gear 41. The center of the eighth gear 42 is connected to the center axis of the first rotor 810. In this manner, the rotational driving force of the eighth gear 42 is transmitted to the first rotor 810.

As described above, the first mechanism 37 transmits the rotational driving force outputted from the third transmission shaft 38 to the first rotor 810. The gear ratio of the first mechanism 37 (a ratio between the rotating speed of the fourth gear 36 and the rotating speed of the eighth gear 42) is set according to the rotating speed required for the first rotor 810. In addition, the first mechanism 37 may employ a belt mechanism or a chain mechanism instead of the gear mechanism.

As shown in FIG. 5, the driving-force transmission mechanism 14 has a third driving-force transmission portion 21.

The third driving-force transmission portion 21 transmits, to the second rotor 820, either the first shaft driving force or the second shaft driving force selected by the selection transmission portion 18.

The third driving-force transmission portion 21 includes a fourth transmission shaft 44 and a second mechanism 52. The second mechanism 52 has a gear mechanism (a ninth gear 45, a tenth gear 46, an eleventh gear 47, and a twelfth gear 48) and a coupling shaft 49. The gears (the ninth gear 45 to the twelfth gear 48) constituting the second mechanism 52 are all bevel gears.

One end side of the fourth transmission shaft 44 is connected to the selection transmission portion 18. In this manner, either the first shaft driving force or the second shaft driving force inputted to the selection transmission portion 18 is transmitted to the fourth transmission shaft 44. In particular, one of the first shaft driving force and the second shaft driving force inputted to the selection transmission portion 18 and selected by the selection transmission portion 18 is transmitted to the fourth transmission shaft 44. The other end side of the fourth transmission shaft 44 is connected to the center of the ninth gear 45. The tenth gear 46 is engaged with the ninth gear 45. The direction of the rotation axis of the tenth gear 46 intersects with the direction of the rotation axis of the ninth gear 45.

The tenth gear 46 is connected to the eleventh gear 47 through the coupling shaft 49. In this manner, the eleventh gear 47 rotates in the same speed and in the same direction as those of the tenth gear 46. The twelfth gear 48 is engaged with the eleventh gear 47. The direction of the rotation axis of the twelfth gear 48 intersects with the direction of the rotation axis of the eleventh gear 47. The center of the twelfth gear 48 is connected to the center axis of the second rotor 820. In this manner, the driving force of the rotating of the twelfth gear 48 is transmitted to the second rotor 820.

The gear ratio of the second mechanism 52 (a ratio between the rotating speed of the ninth gear 45 and the rotating speed of the twelfth gear 48) is set according to the rotating speed required for the second rotor 820. The second mechanism 52 may employ a belt mechanism or a chain mechanism instead of the gear mechanism.

For example, when the gear ratios of the first planetary gear mechanism 151 and the second planetary gear mechanism 152 are both one-third, the angular velocity $\omega 1$ of the fourth transmission shaft 44, the angular velocity $\omega 2$ of the second transmission shaft 34, the angular velocity $\omega 3$ of the second shaft 17, the angular velocity $\omega 4$ of the rotating shaft of the first driver source 11, and the angular velocity $\omega 5$ of the inner gears (the first inner gear 26 and the second inner gear 30) satisfy the following relationships (Expression 1) and (Expression 2). Hereinafter, the expression 1 and the expression 2 may be collectively referred to as "speed relational expressions".

$$\omega 1 = 3 \times \omega 2 - 2 \times \omega 5 \quad \text{(Expression 1)}$$

$$\omega 3 = 3 \times \omega 4 - 2 \times \omega 5 \quad \text{(Expression 2)}$$

When the gear ratio of the planetary gear mechanisms (the first planetary gear mechanism 151 and the second planetary gear mechanism 152) is changed, the speed relational expressions (the expression 1 and the expression 2) are changed corresponds to the change.

Hereinafter, the operation of the driving-force transmission mechanism 14 will be described.

FIG. 6 and FIG. 7 collectively show a plurality of examples of operation patterns of the driving-force transmission mechanism 14 in a table format. FIG. 6 and FIG. 7 show an example of a relation between the rotating speed (SB) of the first driver source 11, the rotating speed (AB) of the second driver source 12, and the rotating speeds (C) of the inner gears (the first inner gear 26 and the second inner gear 30), the rotating speed (SA) of the third transmission shaft 38, the rotating speed (AA) of the fourth transmission shaft 44, the rotating speed (B1) of the first rotation body 810, and the rotating speed (B2) of the second rotation body 820. In this example, the planetary gear mechanisms (the first planetary gear mechanism 151 and the second planetary gear mechanism 152) have the gear ratio of one-third, the first mechanism 37 has a gear ratio of −1.12, and the second mechanism 52 has a gear ratio of 1.12. In addition, the unit of numerical values in the table is (rpm).

In the operation patterns shown in FIG. 6 and FIG. 7, the rotating speed of the second driver source 12 is constant, and the rotating speed of the first driver source 11 is changed. In the following description, the constant rotating speed of the second driver source 12 (1000 rpm in this embodiment) is referred to as a "basic speed".

FIG. 6 shows a case where the selection transmission portion 18 is switched to the second state (a state to be connected to the second shaft 17). In FIG. 6, a row A shows the case where the first driver source 11 is stopped and the second driver source 12 is driven (a first case). A row B shows the case where the first driver source 11 and the second driver source 12 are driven and the rotating speed of the first driver source 11 is set to the first speed (600 rpm) (a second case). A row C shows the case where the first driver source 11 and the second driver source 12 are driven, and the rotating speed of the first driver source 11 is set to a second speed (1000 rpm) faster than the first speed (a third case). In addition, in the first case to the third case, the speed governor 43 is in the off state.

FIG. 7 shows a case where the selection transmission portion 18 is switched to the first state (a state to be connected to the first shaft 16). In FIG. 7, a row D shows the case where the first driver source 11 and the second driver source 12 are driven and the rotating speed of the first driver source 11 is set to a third speed (1333 rpm) faster than the second speed (a fourth case). A row E shows the case where the first driver source 11 and the second driver source 12 are driven and the rotating speed of the first driver source 11 is set to a fourth speed (1135 rpm) that is faster than the second speed and slower than the third speed (a fifth case). In the fourth case and the fifth case, the speed governor 43 is in the on state.

With reference to FIG. 5 to FIG. 7 as appropriate, the operation (the action) of the driving-force transmission mechanism 14 will be described below.

In the following explanation of the operation, when the rotating speed (the rotating number) is displayed, the difference in the rotation direction is expressed by using a symbol "+(plus)" and a symbol "−(minus)". For example, when the first driver source 11 rotates in the forward direction at 1000 rpm, the rotating speed (the rotating number) of the same speed in the reverse direction opposite to the first driver source 11 is described as "−1000 rpm". In addition, for the sake of simplification of description, a value of the rotating speed is directly replaced with the angular speed value in the calculation.

In the first case (corresponding to the row A in FIG. 6), the first driver source 11 is stopped (that is, SB=0, ω4=0), and the second driver source 12 is rotating at the basic speed (1000 rpm) (that is, AB=1000). In addition, the selection transmission portion 18 is switched to the second state (state to be connected to the second shaft 17).

In this case, since the first driver source 11 is stopped, the driving force of the first driver source 11 is not transmitted to the combined planetary gear mechanism 15. Thus, the driving force from the first driver source 11 is not transmitted to both the first rotator 820 and the second rotator 820.

On the other hand, the driving force of the second driver source 12 is transmitted to the second shaft 17 through the PTO shaft 13 and the connecting portion 50. In this manner, the second shaft 17 rotates at the same speed (1000 rpm) as the speeds of the second driver source 12 and the PTO shaft 13 (that is, ω3=1000). The rotational driving force of the second shaft 17 is transmitted (inputted) to the second sun gear 27 and the selection transmission portion 18 of the combined planetary gear mechanism 15.

The driving force of the second driver source 12 inputted to the selection transmission portion 18 is transferred from the second shaft 17 to the fourth transmission shaft 44 through the selection transmission portion 18 because the selection transmission portion 18 is switched to the second state. As the result, the fourth transmission shaft 44 rotates at the same speed (1000 rpm) as the speeds of the second driver source 12 and the PTO shaft 13 (that is, AA=1000, ω1=1000). The rotational driving force of the fourth transmission shaft 44 is transmitted to the second rotor 820 through the second mechanism 52. Since the rotating speed (1000 rpm) of the fourth transmission shaft 44 is changed by 1.12 times by the second mechanism 52, the second rotor 820 rotates at 1120 rpm (that is, B2=1120).

Here, when ω1=1000, ω3=1000, and ω4=0 are applied to the speed relational expressions, ω5=−500 is satisfied from (the expression 2). In the expression 1, since ω5=−500 is satisfied, ω2=0 is satisfied. That is, the rotating speed of the second transmission shaft 34 is zero. Thus, the rotating speed of the first rotor 810 to which the rotational driving force from the second transmission shaft 34 is transmitted is also 0 (that is, B1=0).

As described above, in the first case, the rotating speed of the first rotor 810 is zero, and the rotating speed of the second rotor 820 is 1120 rpm.

In the second case (corresponding to the row B in FIG. 6), the first driver source 11 rotates at the first speed (600 rpm) (that is, SB=600, ω4=600), and the second driver source 12 rotates at the basic speed (1000 rpm) (that is, AB=1000). In addition, the selection transmission portion 18 is switched to the second state (the state to be connected to the second shaft 17).

In this case, the rotational driving force of the first driver source 11 is transmitted to the combined planetary gear mechanism 15 through the first driving-force transmission portion 19. The driving force transmitted from the first driver source 11 to the combined planetary gear mechanism 15 is transmitted to the first rotor 810 through the second driving-force transmission portion 20. However, since the selection transmission portion 18 is switched to the second state, the driving force transmitted from the first driver source 11 to the combined planetary gear mechanism 15 is not transmitted to the third driving-force transmission portion 21 and also not transmitted to the second rotor 820. That is, the rotational driving force of the first driver source 11 is transmitted to the first rotor 810 but not transmitted to the second rotor 820.

On the other hand, the driving force of the second driver source 12 is transmitted to the second shaft 17 through the PTO shaft 13 and the connecting portion 50. In this manner, the second shaft 17 rotates at the speed (1000 rpm) same as the speeds of the second driver source 12 and the PTO shaft 13 (that is, $\omega 3=1000$). The rotational driving force of the second shaft 17 is transmitted (inputted) to the selection transmission portion 18 and the second sun gear 27 of the combined planetary gear mechanism 15.

The driving force of the second driver source 12 inputted to the selection transmission portion 18 is transmitted from the second shaft 17 to the fourth transmission shaft 44 through the selection transmission portion 18 because the selection transmission portion 18 is switched to the second state. As the result, the fourth transmission shaft 44 rotates at the speed (1000 rpm) same as the speeds of the second driver source 12 and the PTO shaft 13 (that is, AA=1000, $\omega 1=1000$). The rotational driving force of the fourth transmission shaft 44 is transmitted to the second rotor 820 through the second mechanism 52. Since the rotating speed (1000 rpm) of the fourth transmission shaft 44 is changed by 1.12 times by the second mechanism 52, the second rotor 820 rotates at 1120 rpm (that is, B2=1120).

Here, when $\omega 1=1000$, $\omega 3=1000$, and $\omega 4=600$ are applied to the speed relational expressions described above, $\omega 5=400$ is obtained from the expression 2. Since $\omega 5=400$, $\omega 2=600$ is obtained from the expression 1. That is, the second transmission shaft 34 rotates at 600 rpm. Then, the rotating speed (600 rpm) of the second transmission shaft 34 is changed by $-1.12$ times by the first mechanism 37 and transmitted to the first rotor 810, so that the first rotor 810 rotates at $-672$ rpm (that is, B1=$-672$).

As described above, in the second case, the rotating speed of the first rotor 810 is $-672$ rpm, and the rotating speed of the second rotor 820 is 1120 rpm.

In the third case (corresponding to the column C in FIG. 6), the first driver source 11 rotates at the second speed (1000 rpm) (that is, SB=1000, $\omega 4=1000$), and the second driver source 12 rotates at the basic speed (1000 rpm) (that is, AB=1000). In addition, the selection transmission portion 18 is switched to the second state (the state to be connected to the second shaft 17).

In that case, the rotational driving force of the first driver source 11 is transmitted to the combined planetary gear mechanism 15 through the first driving-force transmission portion 19. The driving force transmitted from the first driver source 11 to the combined planetary gear mechanism 15 is transmitted to the first rotor 810 through the second driving-force transmission portion 20. However, since the selection transmission portion 18 is switched to the second state, the driving force transmitted from the first driver source 11 to the combined planetary gear mechanism 15 is not transmitted to the third driving-force transmission portion 21 and also is not transmitted to the second rotor 820. That is, the rotational driving force of the first driver source 11 is transmitted to the first rotor 810 but is not transmitted to the second rotor 820.

On the other hand, the driving force of the second driver source 12 is transmitted to the second shaft 17 through the PTO shaft 13 and the connecting portion 50. In this manner, the second shaft 17 rotates at the speed (1000 rpm) same as the speeds of the second driver source 12 and the PTO shaft 13 (that is, $\omega 3=1000$). The rotational driving force of the second shaft 17 is transmitted (inputted) to the selection transmission portion 18 and the second sun gear 27 of the combined planetary gear mechanism 15.

The driving force of the second driver source 12 inputted to the selection transmission portion 18 is transmitted from the second shaft 17 to the fourth transmission shaft 44 through the selection transmission portion 18 because the selection transmission portion 18 is switched to the second state. As the result, the fourth transmission shaft 44 rotates at the speed (1000 rpm) same as the speeds of the second driver source 12 (that is, AA=1000, $\omega 1=1000$). The rotational driving force of the fourth transmission shaft 44 is transmitted to the second rotor 820 through the second mechanism 52. Since the rotating speed (1000 rpm) of the fourth transmission shaft 44 is changed by 1.12 times by the second mechanism 52, the second rotor 820 rotates at 1120 rpm (that is, B2=1120).

Here, when $\omega 1=1000$, $\omega 3=1000$, and $\omega 4=1000$ are applied to the speed relational expressions mentioned above, $\omega 5=1000$ is obtained from (the expression 2). Since $\omega 5=1000$, $\omega 2=1000$ is obtained in the expression 1. That is, the second transmission shaft 34 rotates at 1000 rpm. Then, the rotating speed (1000 rpm) of the second transmission shaft 34 is changed by $-1.12$ times by the first mechanism 37 and transmitted to the first rotor 810, so that the first rotor 810 rotates at $-1120$ rpm (that is, B1=$-1120$).

As described above, in the third case, the rotating speed of the first rotor 810 is $-1120$ rpm, and the rotating speed of the second rotor 820 is 1120 rpm.

In the fourth case (corresponding to the row D in FIG. 7), the first driver source 11 rotates at the third speed (1333 rpm) (that is, SB=1333, $\omega 4=1333$), and the second driver source 12 rotates at the basic speed (1000 rpm) (that is, AB=1000). In addition, the selection transmission portion 18 is switched to the first state (the state to be connected to the first shaft 16).

In that case, the driving force of the second driver source 12 is transmitted to the second shaft 17 through the PTO shaft 13 and the connecting portion 50. In this manner, the second shaft 17 rotates at the speed (1000 rpm) same as the speeds of the second driver source 12 and the PTO shaft 13 (that is, $\omega 3=1000$). The rotational driving force of the second shaft 17 is transmitted (inputted) to the second sun gear 27 and the selection transmission portion 18 of the combined planetary gear mechanism 15.

However, the driving force of the second driver source 12 inputted to the selection transmission portion 18 is not transmitted to the fourth transmission shaft 44 and also is not transmitted to the second rotor 820 because the selection transmission portion 18 is switched to the first state.

On the other hand, the rotational driving force of the first driver source 11 is transmitted to the combined planetary gear mechanism 15 through the first driving-force transmission portion 19. The driving force of the first driver source 11 transmitted to the combined planetary gear mechanism 15 is transmitted to the second rotor 820 through the third driving-force transmission portion 21 because the selection transmission portion 18 is switched to the first state.

The rotating speed of the first rotor 810 is kept constant by the speed governor 43. Here, a case where the rotating speed of the first rotor 810 is set at the speed same as the speed of the rotating speed (1120 rpm) of the second rotor 820 set in the first case to the third case in the opposite direction (that is, B1=$-1120$) is considered. In that case, considering the speed changing (by $-1.12$ times) by the first mechanism 37, the rotating speed of the second transmission shaft 34 is 1000 rpm (that is, SA=1000, $\omega 2=1000$).

When ω2=1000, ω3=1000, and ω4=1333 are applied to the speed relational expressions mentioned above, ω5=1500 is obtained from the expression 2. Since ω5=1500 and ω2=1000, ω1=0 is obtained from in the expression 1. That is, the rotating speed of the fourth transmission shaft 44 is zero. Thus, the rotating speed of the second rotor 820 is also zero (that is, B2=0).

As described above, in the fourth case, the rotating speed of the first rotor 810 is −1120 rpm, and the rotating speed of the second rotor 820 is zero.

In the fifth case (corresponding to the row E in FIG. 7), the first driver source 11 rotates at the fourth speed (1135 rpm) (that is, SB=1135, ω4=1135), and the second driver source 12 rotates at the basic speed (1000 rpm) (that is, AB=1000). In addition, the selection transmission portion 18 is switched to the first state (the state to be connected to the first shaft 16).

In this case, the driving force of the second driver source 12 is transmitted to the second shaft 17 through the PTO shaft 13 and the connecting portion 50. In this manner, the second shaft 17 rotates at the speed (1000 rpm) same as the speeds of the second driver source 12 and the PTO shaft 13 (that is, ω3=1000). The rotational driving force of the second shaft 17 is transmitted (inputted) to the selection transmission portion 18 and the second sun gear 27 of the combined planetary gear mechanism 15.

However, the driving force of the second driver source 12 inputted to the selection transmission portion 18 is not transmitted to the fourth transmission shaft 44 and also not transmitted to the second rotor 820 because the selection transmission portion 18 is switched to the first state.

On the other hand, the rotational driving force of the first driver source 11 is transmitted to the combined planetary gear mechanism 15 through the first driving-force transmission portion 19. The driving force transmitted to the combined planetary gear mechanism 15 is transmitted to the second rotor 820 through the third driving-force transmission portion 21 because the selection transmission portion 18 is switched to the first state.

Here, as in the fourth case, a case where the rotating speed of the first rotor 810 is set to −1120 rpm (that is, B1=1120) will be considered. In this case, the rotating speed of the second transmission shaft 34 is 1000 rpm (that is, SA=1000, ω2=1000).

When ω2=1000, ω3=1000, and ω4=1135 are applied to the speed relational expressions mentioned above, ω5=1203 is obtained from the expression 2. In addition, since ω5=1203 and ω2=1000, ω1 is about 600 (strictly 594) in the expression 1. That is, the rotating speed of the fourth transmission shaft 44 is about 600 rpm. Since the rotating speed (600 rpm) of the fourth transmission shaft 44 is changed by 1.12 times by the second mechanism 52 and transmitted to the second rotor 820, the second rotor 820 rotates at 672 rpm (that is, B2=672).

As described above, in the fifth case, the rotating speed of the first rotor 810 is −1120 rpm, and the rotating speed of the second rotor 820 is 672 rpm.

As shown in the first case to the third case, the selection transmission portion 18 is switched to the second state (the state to be connected to the second shaft 17), so that the rotating speed of the first rotor 810 can be changed in accordance with the changing of the rotating speed of the first driver source 11. In addition, the rotating speed of the first rotator 810 can be changed while the rotating speed of the second rotor 820 is kept constant. In addition, as shown in the fourth case and the fifth case, when the selection transmission portion 18 is switched to the first state (the state to be connected to the first shaft 16), so that the rotating speed of the second rotor 820 can be changed in accordance with the changing of the rotating speed of the first driver source 11. In addition, the rotating speed of the second rotator 820 can be changed while the rotating speed of the first rotor 810 is kept constant.

Second Embodiment of Driver Portion

Next, the driver portion 10 according to a second embodiment of the present invention will be described with reference to FIG. 8.

The driver portion 10 according to the second embodiment includes a first driver source 11 and a driving-force transmission mechanism 14.

The first driver source 11 is a motor as in the first embodiment, and specifically is an electric motor. The first driver source 11 is a driver source that drives the rotors (the first rotor 810 and the second rotor 820) of the spreader portion 8. On the other hand, the second driver source 12 provided in the tractor 3 is also a driver source that drives the rotors (the first rotor 810 and the second rotor 820) of the spreader portion 8.

That is, both the first driver source 11 and the second driver source 12 are capable of driving the first rotor 810 and the second rotor 820. The relation between the driving of the rotors (the first rotor 810 and the second rotor 820) and the driver sources (the first driving source 11 and the second driving source 12) used for the driving will be described below in detail.

The driving-force transmission mechanism 14 is a mechanism configured to transmit the driving force of the first driver source 11 and the driving force of the second driver source 12 to the first rotor 810 and the second rotor 820. In particular, the driving-force transmission mechanism 14 can selectively transmit the driving force of the first driver source 11 or the second driver source 12 to the first rotor 810. In addition, the driving-force transmission mechanism 14 is configured to selectively transmit the driving force of the first driver source 11 or the second driver source 12 to the second rotor 820.

Figure 8:
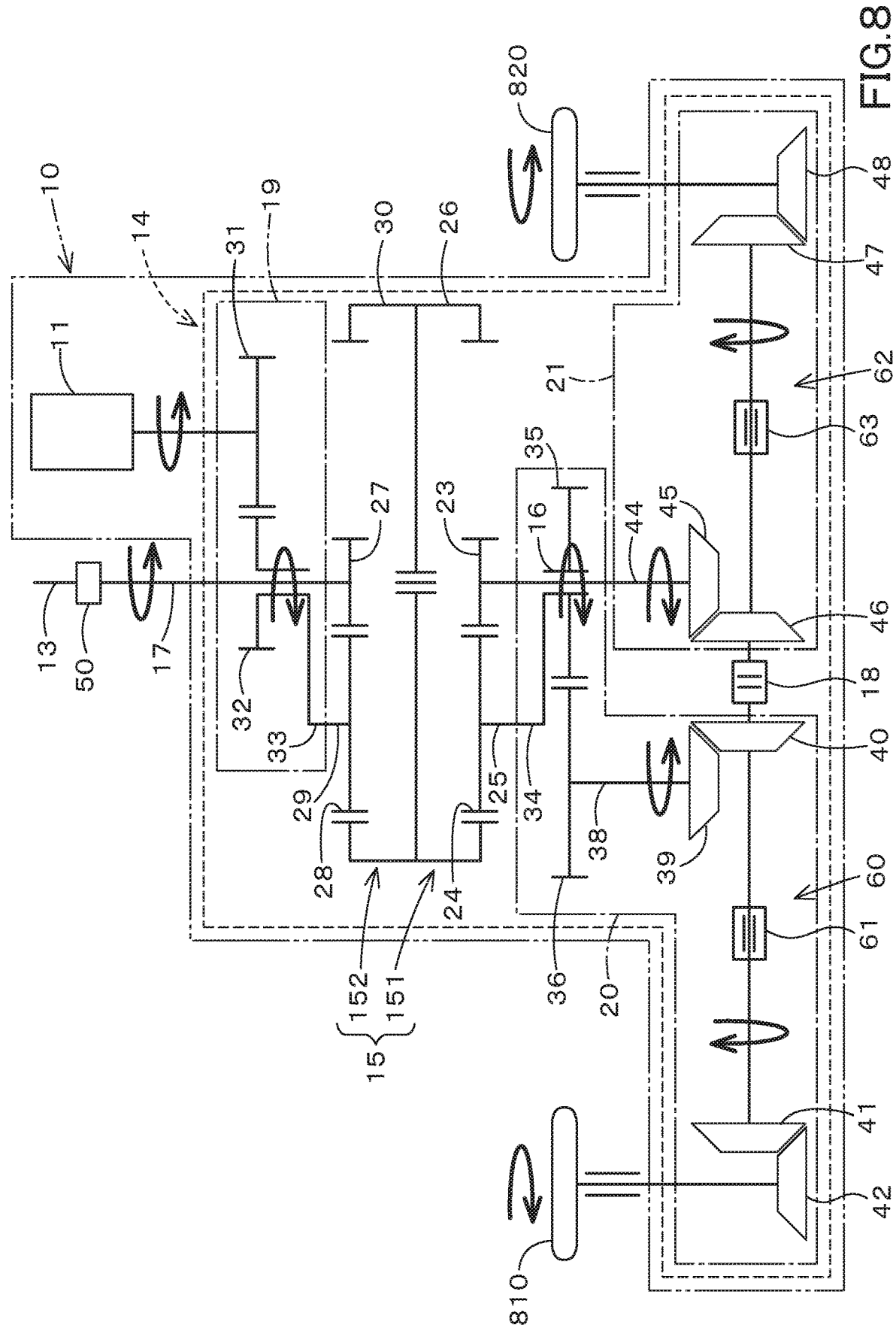
FIG. 8 is a view illustrating a driver portion according to a second embodiment of the present invention.

As shown in FIG. 8, the driving-force transmission mechanism 14 has a combined planetary gear mechanism 15.

The configuration of the combined planetary gear mechanism 15 is the same as that of the first embodiment.

That is, the combined planetary gear mechanism 15 of the second embodiment includes the first planetary gear mechanism 151 and the second planetary gear mechanism 152 as in the first embodiment. The configurations of the first planetary gear mechanism 151 and the second planetary gear mechanism 152 are the same as those of the first embodiment.

As shown in FIG. 8, the driving-force transmission mechanism 14 has a first shaft 16.

The first shaft 16 is a shaft to transmit a driving force from the first driver source 11. In particular, the driving force from the first driver source 11 is transmitted to the first shaft 16 through the first driving-force transmission portion 19 and the combined planetary gear mechanism 15.

The one end side of the first shaft 16 is connected to the first driver source 11 through the first driving-force transmission portion 19 and the combined planetary gear mechanism 15. In particular, one end side of the first shaft 16 is connected to the center of the first sun gear 23 constituting the combined planetary gear mechanism 15. In this manner, the first shaft 16 rotates in synchronization with the rotating of the first sun gear 23. The other end side of the first shaft 16 is connected to the second driving-force transmission portion 20 described later. In this manner, the driving force transmitted from the first driver source 11 to the first shaft 16 is inputted to the second driving-force transmission portion 20.

As shown in FIG. 8, the driving-force transmission mechanism 14 has a second shaft 17.

The second shaft 17 is a shaft to transmit a driving force from the second driver source 12 different from the first driver source 11.

The one end side of the second shaft 17 is connected to the PTO shaft 13 through the connecting portion 50 such as a shaft coupler. In this manner, the driving force of the second driver source 12 is transmitted to the second shaft 17 through the PTO shaft 13 and the connecting portion 50. The other end side of the second shaft 17 is connected to the center of the second sun gear 27 constituting the combined planetary gear mechanism 15. In this manner, the driving force transmitted from the second driver source 11 to the second shaft 17 is inputted to the combined planetary gear mechanism 15.

As shown in FIG. 8, the driving-force transmission mechanism 14 has a first driving-force transmission portion 19.

The first driving-force transmission portion 19 transmits a driving force from the first driver source 11 to the combined planetary gear mechanism 15. The configuration of the first driving-force transmission portion 19 is the same as that of the first embodiment. That is, the first driving-force transmission portion 19 has the first gear 31, the second gear 32, and the first transmission shaft 33 as in the first embodiment.

As shown in FIG. 8, the driving-force transmission mechanism 14 has a second driving-force transmission portion 20.

The second driving-force transmission portion 20 transmits, to the first rotor 810, the rotational driving force outputted from the combined planetary gear mechanism 15. That is, the second driving-force transmission portion 20 transmits, to the first rotor 810, the rotational driving force transmitted from the first driver source 11 or the second driver source 12 through the combined planetary gear mechanism 15.

The second driving-force transmission portion 20 includes a second transmission shaft 34, a third gear 35, a fourth gear 36, a fourth mechanism 60, and a third transmission shaft 38.

One end side of the second transmission shaft 34 is connected to the first planetary carrier 25. The other end side of the second transmission shaft 34 is connected to the third gear 35. The fourth gear 36 is engaged with the third gear 35. In this manner, the second transmission shaft 34 rotates together with the first planetary carrier 25. In addition, the third gear 35 and the fourth gear 36 rotate in synchronization with the rotating of the first planetary carrier 25.

One end side of the third transmission shaft 38 is connected to the center of the fourth gear 36. The third transmission shaft 38 rotates in synchronization with the rotating of the fourth gear 35. The rotating of the fourth gear 36 is transmitted to the first mechanism 37 through the third transmission shaft 38.

The fourth mechanism 60 has a gear mechanism (the fifth gear 39, the sixth gear 40, the seventh gear 41, and the eighth gear 42) and a first brake 61. The gears (the fifth gear 39 to the eighth gear 42) constituting the fourth mechanism 60 are all bevel gears. That is, the fourth mechanism 60 has a configuration in which the speed governor 43 of the first mechanism 37 of the first embodiment is replaced with the first brake 61.

The center of the fifth gear 39 is connected to the other end side of the third transmission shaft 38. The sixth gear 40 is engaged with the fifth gear 39. The direction of the rotation axis of the sixth gear 40 intersects with the direction of the rotation axis of the fifth gear 39.

The seventh gear 41 is connected to the sixth gear 40 through the first brake 61. The first brake 61 can reduce the rotating of the sixth gear 40 and transmit the rotating to the seventh gear 41, or can stop the rotating of the sixth gear 40 not to transmit the rotating to the seventh gear 41. The first brake 61 is constituted of, for example, an electric brake. When the first brake 61 is not activated, the seventh gear 41 rotates at the same speed and in the same direction as those of the sixth gear 40. The eighth gear 42 is engaged with the seventh gear 41. The direction of the rotation axis of the eighth gear 42 intersects with the direction of the rotation axis of the seventh gear 41. The center of the eighth gear 42 is connected to the center axis of the first rotor 810. In this manner, the rotational driving force of the eighth gear 42 is transmitted to the first rotor 810.

As described above, the fourth mechanism 60 transmits the rotational driving force outputted from the third transmission shaft 38 to the first rotor 810. The gear ratio of the fourth mechanism 60 (a ratio between the rotating speed of the fifth gear 39 and the rotating speed of the eighth gear 42) is set according to the rotating speed required for the first rotor 810. The fourth mechanism 60 may employ a belt mechanism or a chain mechanism instead of the gear mechanism.

In addition, as will be described later, the second driving-force transmission portion 20 can transmit, to the first rotor 810 through the selection transmission portion 18, the driving force transmitted from the second driver source 12 to the third driving-force transmission portion 21 when the selection transmission portion 18 is switched to the allowing state.

As shown in FIG. 8, the driving-force transmission mechanism 14 has a third driving-force transmission portion 21.

The third driving-force transmission portion 21 transmits, to the second rotor 820, the rotational driving force transmitted from the first driver source 11 or the second driver source 12 through the combined planetary gear mechanism 15.

The third driving-force transmission portion 21 includes a fourth transmission shaft 44 and a fifth mechanism 62. The fifth mechanism 62 includes a gear mechanism (the ninth gear 45, the tenth gear 46, the eleventh gear 47, the twelfth gear 48) and a second brake 63. The gears (the ninth gear 45 to the twelfth gear 48) constituting the fifth mechanism 62 are all bevel gears. That is, the fifth mechanism 62 has a configuration in which the coupling shaft 49 of the first mechanism 37 of the first embodiment is replaced with the second brake 63.

One end side of the fourth transmission shaft 44 is connected to the center of the first sun gear 23 of the combined planetary gear mechanism 15. In this manner, the rotational driving force outputted from the first sun gear 23 of the combined planetary gear mechanism 15 is outputted to the fourth transmission shaft 44. The other end side of the fourth transmission shaft 44 is connected to the center of the ninth gear 45. The tenth gear 46 is engaged with the ninth gear 45. The direction of the rotation axis of the tenth gear 46 intersects with the direction of the rotation axis of the ninth gear 45.

The tenth gear 46 is connected to the eleventh gear 47 through the second brake 63. The second brake 63 can reduce the rotating of the tenth gear 46 and transmit the rotating to the eleventh gear 47, or can stop the rotating of the tenth gear 46 not to transmit the rotating to the eleventh gear 47. The second brake 63 is constituted of, for example, an electric brake. When the second brake 63 is not activated, the eleventh gear 47 rotates in the same speed and in the same direction as those of the tenth gear 46. The twelfth gear 48 is engaged with the eleventh gear 47. The direction of the rotation axis of the twelfth gear 48 intersects with the direction of the rotation axis of the eleventh gear 47. The center of the twelfth gear 48 is connected to the center axis of the second rotor 820. In this manner, the driving force of the rotating of the twelfth gear 48 is transmitted to the second rotor 820.

The gear ratio of the fifth mechanism 62 (a ratio between the rotating speed of the ninth gear 45 and the rotating speed of the twelfth gear 48) is set according to the rotating speed required for the second rotor 820. The fifth mechanism 62 may employ a belt mechanism or a chain mechanism instead of the gear mechanism.

In addition, as will be described later, the third driving-force transmission portion 21 transmits, to the second rotor 820 through the selection transmission portion 18, the driving force transmitted from the first driver source 11 to the second driving-force transmission portion 20 when the selection transmission portion 18 is switched to the allowing state.

As shown in FIG. 8, the driving-force transmission mechanism 14 has the selection transmission portion 18.

The selection transmission portion 18 is configured to transmit the driving force from the first shaft 16 (a first shaft force) and the driving force from the second shaft 17 (a second shaft force) selectively to the first rotor 810 or the second rotor 820.

The selection transmission portion 18 is constituted of the clutch configured to be switched by an operation lever or the like. The selection transmission portion 18 is preferably constituted of an electric clutch, but may be constituted of a mechanical clutch.

The selection transmission portion 18 can allow or block the transmitting of driving force between the second driving-force transmission portion 20 and the third driving-force transmission portion 21. In particular, the selection transmission portion 18 can allow or block the transmitting of driving force between the fourth mechanism 60 of the second driving-force transmission portion 20 and the fifth mechanism 62 of the third driving-force transmission portion 21. More specifically, the selection transmission portion 18 can allow or block the connecting between the center axis of the sixth gear 40 of the fourth mechanism 60 and the center axis of the tenth gear 46 of the fifth mechanism 62.

The switching of the selection transmission portion 18 switches the driving-force transmission between a state (a blocking state) to block the driving-force transmission between the second driving-force transmission portion 20 (the sixth gear 40) and the third driving-force transmission portion 21 (the tenth gear 46) and a state (a allowing state) to allow the driving-force transmission between the second driving-force transmission portion 20 (the sixth gear 40) and the third driving-force transmission portion 21 (the tenth gear 46).

When the selection transmission portion 18 is switched to the blocking state, the driving force transmitted to the second driving-force transmission portion 20 can be transmitted only to the first rotor 810. In addition, the driving force transmitted to the third driving-force transmission portion 21 can be transmitted only to the second rotor 820.

The driving force transmitted to the second driving-force transmission portion 20 can be transmitted to the first rotator 810 and the second rotator 820 when the selection transmission portion 18 is switched to the allowing state. In particular, the driving force transmitted to the second driving-force transmission portion 20 can be transmitted from the sixth gear 40 to the first rotor 810 through the seventh gear 41 and can be transmitted from the sixth gear 40 to the second rotor 820 through the tenth gear 46.

When the selection transmission portion 18 is switched to the allowing state, the driving force transmitted to the third driving-force transmission portion 21 can also be transmitted to the first rotor 810 and the second rotor 820. In particular, the driving force transmitted to the third driving-force transmission portion 21 can be transmitted from the tenth gear 46 to the first rotor 810 through the sixth gear 40, and can be transmitted from the tenth gear 46 to the second rotor 820 through the eleventh gear 47.

As described above, the driving force from the first driver source 11 can be transmitted to both the first rotator 810 and the second rotator 820 by switching the selection transmission portion 18 to the allowing state. Thus, by employing a variable speed motor as the first driver source 11, the rotating speeds of the first rotation body 810 and the second rotation body 820 both can be changed even when the rotating speed of the second driver source 12 is constant.

In addition, even when the selection transmission portion 18 is switched to any of the allowing state and the blocking state, the rotating speed of the first rotor 810 can be changed (decreased or stopped) by activating the first brake 1. In addition, by activating the second brake 62, the rotating speed of the second rotor 820 can be changed (decreased or stopped).

The spreader device according to the embodiment mentioned above includes the container portion 7 that contains the spread substance, the first spreader portion 81 that has the first rotor 810 configured to spread the spread substance contained in the container portion 7, the second spreader portion 82 that has the second rotor 820 configured to spread the spread substance contained in the container portion 7, the first driving source 11 configured to drive the first rotor 810, the first shaft 16 to transmit the driving force from the first driver source 11, the second shaft 17 to transmit the driving force from the second driver source 11 different from the second driver source 12, and the selection transmission portion 18 configured to transmit the driving force from the first shaft 16 and the driving force from the second shaft 16 selectively to the first rotor 810 or the second rotor 820.

According to this configuration, the driving force from the first shaft 16 and the driving force from the second shaft 17 can be selectively transmitted to the first rotor 810 or the second rotor 820 through the selection transmission portion 18. Thus, the first rotor 810 or the second rotor 820 can be driven (rotated) by selectively using the driving force from the first driver source 11 and the driving force from the second driver source 12. That is, since the driving force from a plurality of driver sources can be selectively transmitted to the rotor, the rotating speed of the rotor that spreads the spread substance can be changed as necessary. Thus, the optimal spreading can be realized according to the shape of the agricultural field, the position of the spreader device, the planting position of the crops, and the like.

In addition, the spreader device includes the attachment portion 9 that is attached to the traveling vehicle 3. The first driver source 11 is a motor. The second driver source 12 is an internal combustion engine (an engine) provided in the traveling vehicle 3. The driving force of the second driver source 12 is transmitted to the second shaft 17 through the PTO shaft 13 of the traveling vehicle 3.

According to this configuration, by using the internal combustion engine provided in the traveling vehicle 3 as the second driving source 12, the currently-provided driver source (the internal combustion engine) provided in the traveling vehicle 3 can be used without preparing a new driver source (such as a motor) as the second driving source 12. In addition, by using in combination both the driving force from the motor that is the first driver source 11 and the driving force from the internal combustion engine that is the second driver source 12, it is possible to reduce the electricity consumption in comparison with the case of using two motors. In addition, the rotating speed of the rotor can be easily changed by the motor serving as the first driver source 11.

In addition, the selection transmission portion 18 can receive the driving force from the first shaft 16 and the driving force from the second shaft 17, and can transmits the received driving force from the first shaft 16 and the received driving force from the second shaft 17 selectively to the second rotor 820.

Figure 9:
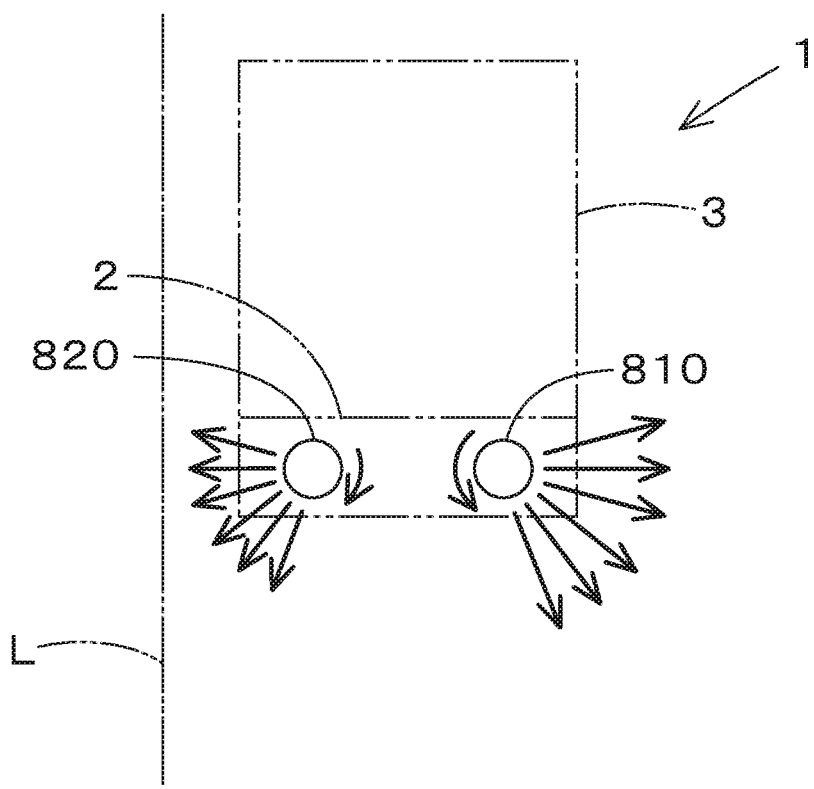
FIG. 9 is a planar view illustrating one example of a spreading method according to the second embodiment.

According to this configuration, the second rotor 820 can be driven (rotated) by selectively using the driving force from the first driver source 11 and the driving force from the second driver source 12. In this manner, it becomes possible to make the rotating speed of the second rotor 820 different from the rotating speed of the first rotor 810, and the optimal spreading can be realized according to the shape of an agricultural field, the position of the spreader device, the planting position of crops, and the like. For example, by making the rotating speed of the first rotator 810 faster than the rotating speed of the second rotator 820, the spread distance on one side in the vehicle body width direction can be made longer than the spread distance on the other side. In this manner, for example, when the tractor 3 performs the spreading while traveling in the vicinity of the boundary line L of the agricultural field as shown in FIG. 9, the rotating speed of the rotor (the second rotor 820) near the boundary line L is set to be slower, and thereby it is possible to prevent the spread substance from being spread beyond the boundary line L. The boundary line L is, for example, a line indicating the edge of the agricultural field (a boundary line with a road, a boundary line with a building, a boundary line with another person's field, and the like), a boundary line between different crops, or the like.

In addition, the spreader device includes the first driving-force transmission portion 19 configured to transmit the driving force from the first driver source 11, the second driving-force transmission portion 20 configured to transmit the driving force to the first rotor 810, and the driving-force transmission mechanism 14 configured to receive the driving force transmitted from the first driving-force transmission portion 19 and the driving force transmitted from the second shaft 17 and to transmit the received driving forces to the second driving-force transmission portion 20 and the selection transmission portion 18.

According to this configuration, the driving force transmitted from the first driving-force transmission portion 19 and the driving force transmitted from the second shaft 17 can be transmitted to the second driving-force transmission portion 20 and the selection transmission portion 18 by the driving-force transmission mechanism 14. Thus, the driving force from the first driver source 11 can be transmitted from the selection transmission portion 18 to the second rotor 820. In addition, the driving force from the second driver source 12 can be transmitted from the second driving-force transmission portion 20 to the first rotor 810.

In addition, the driving-force transmission mechanism 14 is configured to change the rotating speed of the first driver source 11 to change the rotating speed of the second rotor 820 when the selection transmission portion 18 is in the first state in which the driving force from the first shaft 16 can be transmitted to the second rotator 820, and to change the rotating speed of the first driver source 11 to change the rotating speed of the first rotor 810 when the selection transmission portion 18 is in the second state in which the driving force from the second shaft 17 can be transmitted to the second rotator 820.

According to this configuration, when the selection transmission portion 18 is switched between the first state and the second state, the change in the rotating speed of the first rotation body 810 and the change in the rotating speed of the second rotation body 820 can be realized by changing the rotating speed of the driver source 11.

In addition, the spreader device includes the first driving-force transmission portion 19 configured to transmit the driving force from the first driver source 11, the second driving-force transmission portion 20 configured to transmit the driving force to the first rotor 810, the third driving-force transmission portion 21 configured to transmit the driving force to the second rotor 820, and the driving-force transmission mechanism 14 configured to receive the driving force transmitted from the first driving-force transmission portion 19 and the driving force transmitted from the second shaft 17, and to transmit the received driving forces to the second driving-force transmission portion 20 and the third driving-force transmission portion 21.

According to this configuration, the driving force transmitted from the first driving-force transmission portion 19 and the driving force transmitted from the second shaft 17 can be transmitted to the second driving-force transmission portion 20 and the third driving-force transmission portion 21 by the driving-force transmission mechanism 14. Thus, the driving force from the first driver source 11 or the driving force from the second driver source 12 can be transmitted from the second driving-force transmission portion 20 to the first rotor 810, and can be transmitted from the third driving-force transmission portion 21 to the second rotator 820.

In addition, the selection transmission portion 18 has the allowing state allowing the driving force to be transmitted between the second driving-force transmission portion 20 and the third driving-force transmission portion 21, and has the blocking state blocking the transmission of the driving force between the second driving-force transmission portion 20 and the third driving-force transmission portion 21.

According to this configuration, when switching the selection transmission portion 18 to the allowing state, the driving force transmitted to the second driving-force transmission portion 20 can be transmitted from the third driving-force transmission portion 21 to the second rotor 820, and the driving force transmitted to the third driving-force transmission portion 21 can be transmitted from the second driving-force transmission portion 20 to the first rotor 810. In addition, when switching the selection transmission portion 18 to the blocking state, the driving force transmitted to the second driving-force transmission portion 20 can be transmitted only to the first rotor 810, and the driving force transmitted to the third driving-force transmission portion 21 can be transmitted only to the rotor 820.

Next, a spreader device according to a first modification example of the present embodiment will be described. Hereinafter, for convenience of the explanation, the spreader device according to the first modification example is referred to as a "second spreader device".

Figure 10:
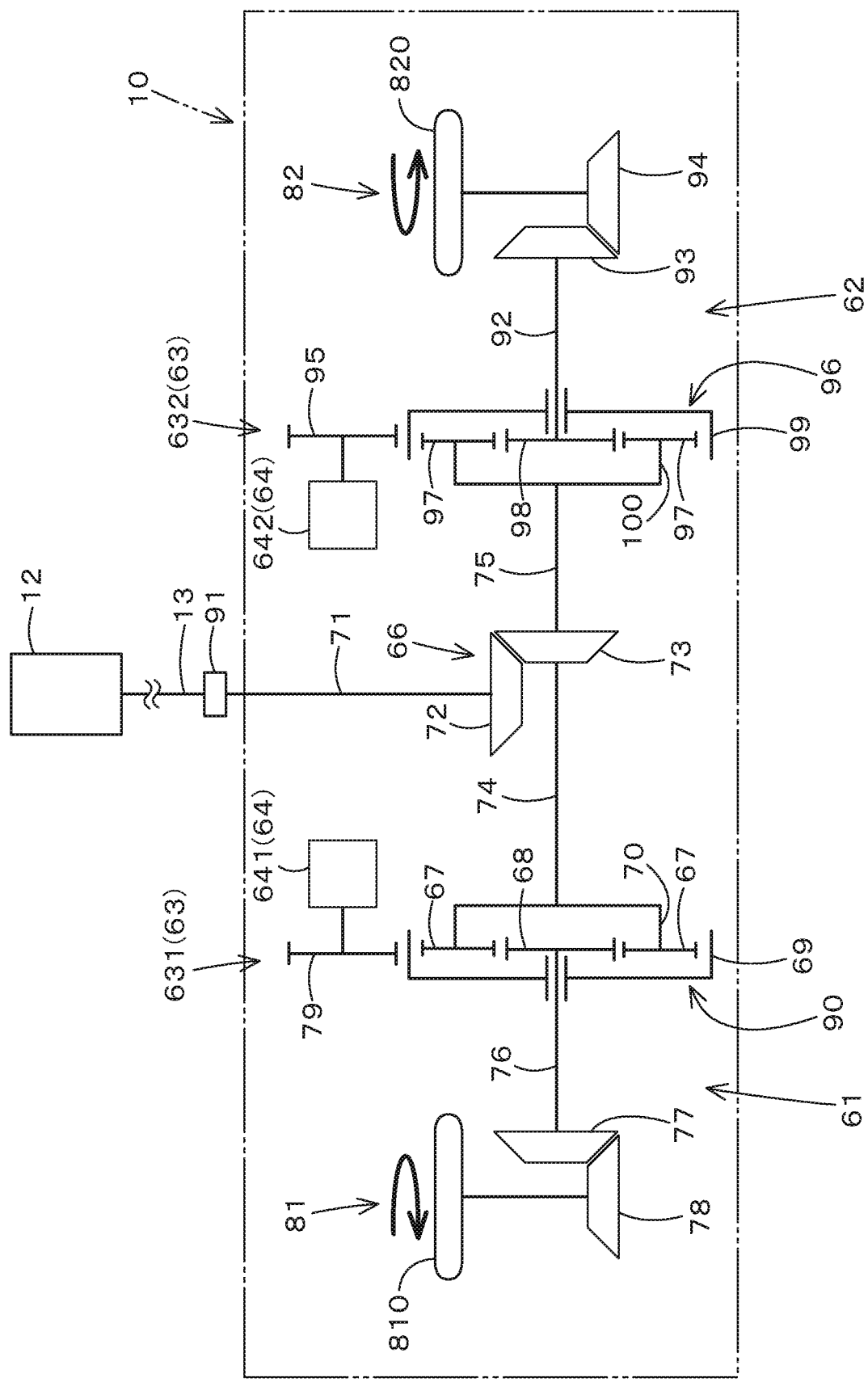
FIG. 10 is a view illustrating a driver portion of a spreader device according to a first modification example of the second embodiment.

The second spreader device is different from the spreader device 2 of the above-described embodiment only in the configuration of the driver portion 10 shown in FIG. 10. That is, the second spreader device is similar to the spreader device 2 according to the above-described embodiment except for the configuration of the driver portion 10 (the container portion 7, the spreader portion 8, and the attachment portion 9). In addition, the second spreader device also constitutes the spreader machine 1 by being coupled to the traveling vehicle (the tractor) 3 through the coupling device 6 similarly to the spreader device 2 according to the embodiment mentioned above. The configurations of the traveling vehicle 3 and the coupling device 6 are as described above.

First, a schematic configuration of the second spreader device will be described.

The second spreader device includes the container portion 7 configured to store the spread substance, the first spreader portion 81 having the first rotor 810 configured to spread the spread substance contained in the container portion 7, the second spreader portion 82 having the second rotor 820 configured to spread the spread substance contained in the container portion 7, the first transmission portion 61 configured to transmit the driving force to the first rotor 810, and the second transmission portion 62 configured to transmit the driving force to the second rotor 820. The first transmission portion 61 or the second transmission portion 62 is configured to have the speed-shifting portion including the driver source 64 configured to apply the rotation driving force to a passage for transmitting the driving force to the first rotor 810 or the second rotor 820 and thereby to change the rotating speed of the first rotor 810 or the second rotor 820.

In addition, the second spreader device includes another driver source 12 different from the driver source 64 included in the speed-shifting portion 63 and includes the dividing transmission portion 66 configured to transmit the driving force from the other driver source 12 separately to the first transmission portion 61 and the second transmission portion 62.

The speed-shifting portion 63 includes the planetary gears 67 and 97 connected to the dividing transmission portion 66, the sun gears 68 and 98 engaged with the planetary gears 67 and 97 and configured to transmit the driving force to the first rotor 810 or the second rotor 820, and the inner gears 69 and 99 having the internal teeth engaged with the planetary gears 67 and 97 and having the external teeth to which the driving force from the driver source 64 is transmitted.

The speed-shifting portion 63 includes the first speed-shifting portion 631 provided in the first transmission portion 61, and includes the second speed-shifting portion 632 provided in the second transmission portion 62. The driver source 64 includes the first motor 641 included in the first speed-shifting portion 631, and includes the second motor 642 included in the second speed-shifting portion 632.

In addition, the second spreader device includes the attachment portion (the frame) 9 configured to be attached to the traveling vehicle 3. The other driver source 12 is an internal combustion engine provided in the traveling vehicle 3. The driving force of the other driver source 12 is transmitted to the dividing transmission portion 66 through the PTO shaft 13 of the traveling vehicle 3.

Next, a specific configuration of the second spreader device will be described.

As described above, the configuration of the second spreader device other than the driver portion 10 is the same as the configuration of the spreader device 2 of the above-described embodiment. Thus, the specific configuration of the driver portion 10 of the second spreader device will be described based on FIG. 10.

In the driver portion 10 of the second spreader device, the driver source 64 is an electric motor. As shown in FIG. 1, the other driver source 12 is an internal combustion engine provided in the traveling vehicle 3, specifically an engine, and preferably a diesel engine.

The driving force of the other driver source (the engine) 12 is transmitted to the PTO shaft 13 of the traveling vehicle 3. One end side of the transmission shaft 71 is connected to the PTO shaft 13 through the connecting portion 91 such as a shaft coupler. The other end of the transmission shaft 71 is connected to the dividing transmission portion 66. The transmission shaft 71 transmits, to the dividing transmission portion 66, the driving force from the PTO shaft 13.

The dividing transmission portion 66 transmits the driving force from the other driver source 12 (the driving force transmitted from the transmission shaft 71) separately to one and to the other. The dividing transmission portion 66 includes the first transmission gear 72, the second transmission gear 73, the one transmission shaft 74, and the other transmission shaft 75.

The other end side of the transmission shaft 71 is connected to the center of the first transmission gear 72. The second transmission gear 73 is engaged with the first transmission gear 72. The gears (the first transmission gear 72 and the second transmission gear 73) constituting the dividing transmission portion 66 are all bevel gears. The direction of the rotation axis of the first transmission gear 72 intersects (orthogonally) with the direction of the rotation axis of the second transmission gear 73.

One end side of the one transmission shaft 74 and one end side of the other transmission shaft 75 are connected to the second transmission gear 73, respectively. The one transmission shaft 74 and the other transmission shaft 75 extend from the center of the second transmission gear 73 toward opposite sides.

In this manner, the driving force transmitted from the transmission shaft 71 to the dividing transmission portion 66 is transmitted from the second transmission gear 73 separately into one transmission shaft 74 (one) and the other transmission shaft 75 (the other) in the dividing transmission portion 66.

The first transmission portion 61 transmits, to the first rotor 810, the driving force transmitted from the dividing transmission portion 66 to one side (the one transmission shaft 74). The first transmission portion 61 includes the first speed-shifting portion 631, the first output shaft 76, the third transmission gear 77, and the fourth transmission gear 78.

The first speed-shifting portion 631 includes the first motor 641. The first speed-shifting portion 631 changes the rotating speed of the first rotor 810 in accordance with the speed-shifting of the first motor 641. The first speed-shifting portion 631 includes the drive gear 79 and the planetary gear mechanism 90.

The drive gear 79 is connected to the first motor 641, and rotates in shyncronization with the driving of the first motor 641.

The planetary gear mechanism 90 includes the sun gear 68, the planetary gear 67, the planetary carrier 70, and the inner gear 69.

The sun gear 68 is engaged with the planetary gear 67. The planetary gear 67 is supported rotatably by the planetary carrier 70, and is configured to rotate (revolve) around the sun gear 68. The planetary carrier 70 rotates in synchronization with the rotating (revolving) of the planetary gear 67. The other end of the one transmission shaft 74 is connected to the planetary carrier 70. In this manner, the planetary gear 67 is connected to the dividing transmission portion 66 through the planetary carrier 70 and the one transmission shaft 74. The inner gear 69 has the internal teeth formed on the inner peripheral surface and has the external teeth formed on the outer peripheral surface. The internal teeth is engaged with the planetary gear 67. The external teeth is engaged with the drive gear 79.

One end side of the first output shaft 76 is connected to the center of the sun gear 68. The other end side of the first output shaft 76 is connected to the third transmission gear 77. The fourth transmission gear 78 is engaged with the third transmission gear 77. The third transmission gear 77 and the fourth transmission gear 78 are both bevel gears. The direction of the rotation axis of the third transmission gear 77 intersects (orthogonal) with the direction of the rotation axis of the fourth transmission gear 78. The center of the fourth transmission gear 78 is connected to the center axis of the first rotor 810. In this manner, the rotational driving force of the fourth transmission gear 78 is transmitted to the first rotor 810. That is, the rotational driving force of the sun gear 68 is transmitted to the first rotor 810 through the first output shaft 76, the third transmission gear 77, and the fourth transmission gear 78.

The second transmission portion 62 transmits, to the second rotor 820, the driving force transmitted from the dividing transmission portion 66 to the other (the other transmission shaft 75). The second transmission portion 62 includes the second speed-shifting portion 632, the second output shaft 92, the fifth transmission gear 93, and the sixth transmission gear 94.

The second speed-shifting portion 632 includes the second motor 642. The second speed-shifting portion 632 changes the rotating speed of the second rotor 820 according to the speed shifting of the second motor 642. The second speed-shifting portion 632 includes the drive gear 95 and the planetary gear mechanism 96.

The drive gear 95 is connected to the second motor 642, and rotates in synchronization with the driving of the second motor 642.

The planetary gear mechanism 96 has the sun gear 98, the planetary gear 97, the planetary carrier 100, and the inner gear 99.

The sun gear 98 is engaged with the planetary gear 97. The planetary gear 97 is rotatably supported by the planetary carrier 100, and can rotate (revolve) around the sun gear 98. The planetary carrier 100 rotates in synchronization with the rotating (revolving) of the planetary gear 97. The other end side of the other transmission shaft 75 is connected to the planetary carrier 100. In this manner, the planetary gear 97 is connected to the dividing transmission portion 66 through the planetary carrier 100 and the other transmission shaft 75. The inner gear 99 has internal teeth formed on the inner peripheral surface and has external teeth formed on the outer peripheral surface. The internal teeth are engaged with the planetary gear 97. The external teeth are engaged with the drive gear 95.

One end of the second output shaft 92 is connected to the center of the sun gear 98. The other end side of the second output shaft 92 is connected to the fifth transmission gear 93. The sixth transmission gear 94 is engaged with the fifth transmission gear 93. The fifth transmission gear 93 and the sixth transmission gear 94 are both bevel gears. The direction of the rotation axis of the fifth transmission gear 93 intersects (orthogonal) with the direction of the rotation axis of the sixth transmission gear 94. The center of the sixth transmission gear 94 is connected to the center axis of the second rotor 820. In this manner, the rotational driving force of the sixth transmission gear 94 is transmitted to the second rotor 820.

Hereinafter, an operation (an action) of the driver portion 10 of the second spreader device will be described.

The driving force from another driver source (the engine) 12 is transmitted to the dividing transmission portion 66 through the PTO shaft 13, the connecting portion 91, and the transmission shaft 71.

The dividing transmission portion 66 transmits the driving force transmitted from the transmission shaft 71 separately to one (the one transmission shaft 74) and the other (the other transmission shaft 75). That is, the dividing transmission portion 66 transmits the driving force from the other driver source 12 separately to one and the other.

The driving force transmitted to one side (the one transmission shaft 74) from the dividing transmission portion 66 is transmitted to the first rotor 810 through the first transmission portion 61. In particular, the planetary carrier 70 is rotated by the driving force transmitted to the one transmission shaft 74, and the planetary gear 67 and the sun gear 68 are rotated in synchronization with the rotating of the planetary carrier 70. The rotational driving force of the sun gear 68 is transmitted to the first rotor 810 through the first output shaft 76, the third transmission gear 77, and the fourth transmission gear 78.

The driving force transmitted from the dividing transmission portion 66 to the other (the other transmission shaft 75) is transmitted to the second rotor 820 through the second transmission portion 62. In particular, the planetary carrier 100 is rotated by the driving force transmitted to the other transmission shaft 75, and the planetary gear 97 and the sun gear 98 are rotated in synchronization with the rotating of the planetary carrier 100. The rotational driving force of the sun gear 98 is transmitted to the second rotor 820 through the second output shaft 92, the fifth transmission gear 93, and the sixth transmission gear 94.

Accordingly, the first rotor 810 and the second rotor 820 can be rotated by the driving force outputted from the other driver source 12.

Next, the operation of the speed-shifting portion 63 will be described below.

First, the operation of the first speed-shifting portion 631 will be described.

When the first motor 641 that is the driver source 64 of the first speed-shifting portion 631 is driven, the driving force from the first motor 641 is transmitted to the external teeth of the inner gear 69 through the drive gear 79. Thus, when the first motor 641 is driven, the inner gear 69 rotates. The rotating of the inner gear 69 is transmitted to the planetary gear 67 through the internal teeth of the inner gear 69, and thus the planetary gear 67 rotates. The rotating of the planetary gear 67 is transmitted to the sun gear 68 and then transmitted to the first rotor 810 through the first output shaft 76, the third transmission gear 77, and the fourth transmission gear 78.

As described above, the driving force from the first speed-shifting portion 631 including the first motor 641 is transmitted to the first rotor 810. Thus, the rotating speed of the first rotor 810 can be changed according to the speed shifting of the first motor 641. In other words, the driver source 64 (the first motor 641) of the first speed-shifting portion 631 is configured to apply the rotation driving force to a passage for transmitting the driving force to the first rotor 810 and thereby to change the rotating speed of the first rotor 810.

Next, the operation of the second speed-shifting portion 632 will be described.

When the second motor 642 that is the driver source 64 of the second speed-shifting portion 632 is driven, the driving force from the second motor 642 is transmitted to the external teeth of the inner gear 99 through the drive gear 95. Thus, when the second motor 642 is driven, the inner gear 99 rotates. The rotating of the inner gear 99 is transmitted to the planetary gear 97 through the internal teeth of the inner gear 99, and thus the planetary gear 97 rotates. The rotating of the planetary gear 97 is transmitted to the sun gear 98 and then transmitted to the second rotor 820 through the second output shaft 92, the fifth transmission gear 93, and the sixth transmission gear 94.

As described above, the driving force from the second speed-shifting portion 632 including the second motor 642 is transmitted to the second rotor 820. Thus, the rotating speed of the second rotor 820 can be changed according to the speed shifting of the second motor 642. In other words, the driver source 64 (the second motor 642) of the second speed-shifting portion 632 is configured to apply the rotation driving force to a passage for transmitting the driving force to the second rotor 820 and thereby to change the rotating speed of the second rotor 820.

As described above, the first speed-shifting portion 631 can change the rotating speed of the first rotor 810, and the second speed-shifting portion 632 can change the rotating speed of the second rotor 820. Thus, the rotating speed of the first rotor 810 and the rotating speed of the second rotor 820 can be made different as necessary.

In this manner, the spreading distance of the spread substance by the first rotor 810 and the spreading distance of the spread substance by the second rotor 820 can be made different as necessary. In this manner, the optimal spreading can be realized according to the shape of the agricultural field, the position of the spreader device, the planting position of the crops, and the like.

Next, a spreader device according to a second modification example will be described. Hereinafter, for convenience of the explanation, the spreader device according to the second modification example is referred to as a "third spreader device".

Figure 11:
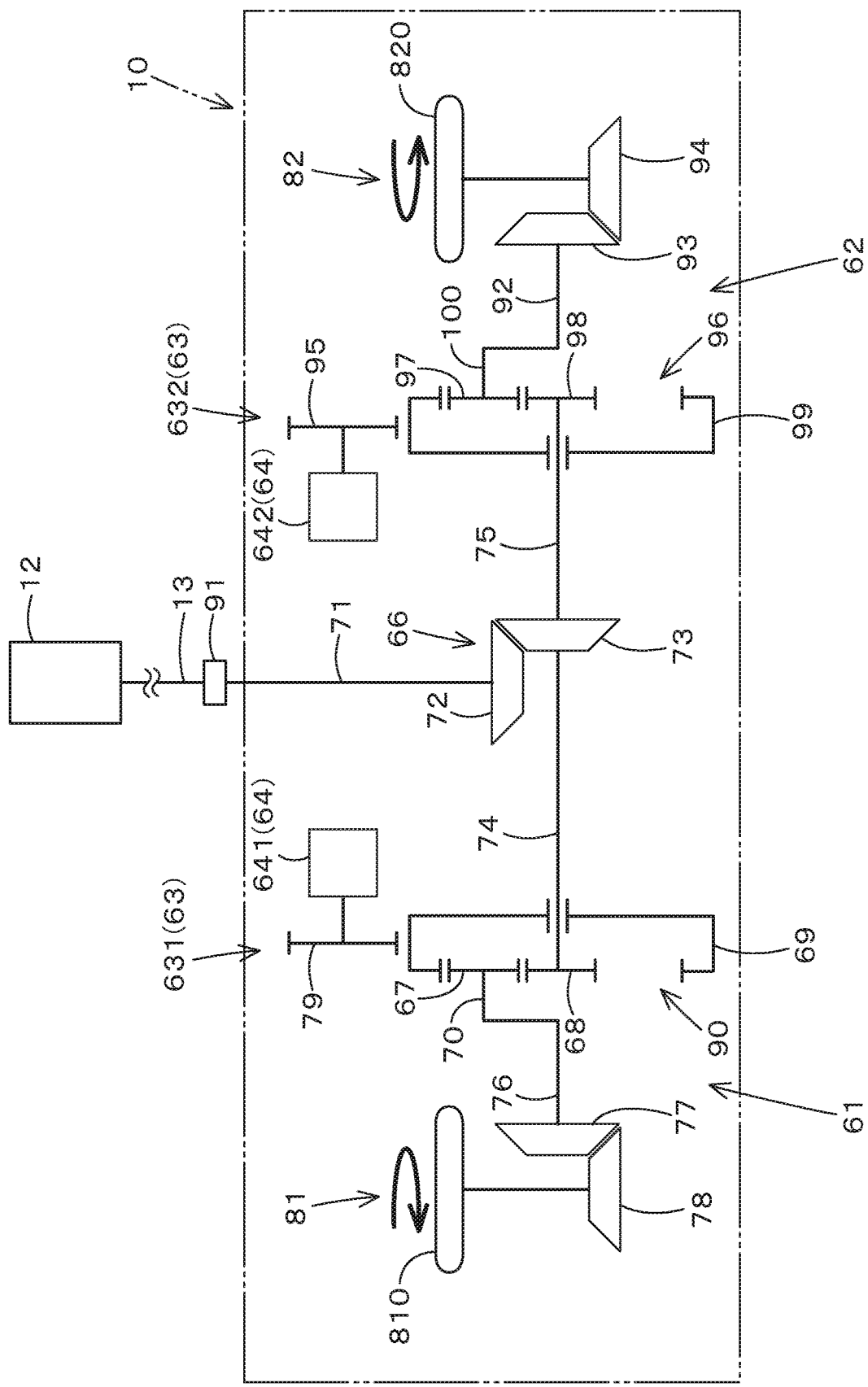
FIG. 11 is a view illustrating a driver portion of a spreader device according to a second modification example of the second embodiment.

The third spreader device is different from the spreader device 2 of the above-described embodiment (the embodiment shown in FIG. 1 to FIG. 8) only in the configuration of the driver portion 10 shown in FIG. 11. That is, the third spreader device is similar to the spreader device 2 according to the above-described embodiment except for the configuration of the driver portion 10 (the container portion 7, the spreader portion 8, and the attachment portion 9). In addition, the third spreader device also constitutes the spreader machine 1 by being coupled with the traveling vehicle (the tractor) 3 through the coupling device 6 similarly to the spreader device 2 according to the embodiment mentioned above. The configurations of the traveling vehicle 3 and the coupling device 6 are as described above. In addition, the third spreader device is different from the spreader device (the second spreader device) of the first modification example only in the configuration of the speed-shifting portion 63.

First, a schematic configuration of the third spreader device will be described.

The third spreader device includes the container portion 7 configured to contain the spread substance, the first spreader portion 81 having the first rotor 810 configured to spread the spread substance contained in the container portion 7, the second spreader portion 81 having the second rotor 820 configured to spread the spread substance contained in the container portion 7, the first transmission portion 61 configured to transmit the driving force to the first rotor 810, and the second transmission portion 62 configured to transmit the driving force to the second rotor 820. The first transmission portion 61 or the second transmission portion 62 is configured to have the speed-shifting portion 63 including the driver source 64 configured to apply the rotation driving force to a passage for transmitting the driving force to the first rotor 810 or the second rotor 820 and thereby to change the rotating speed of the first rotor 810 or the second rotor 820.

In addition, the third spreader device includes another driver source 12 different from the driver source 64 included in the speed-shifting portion 63, and includes the dividing transmission portion 66 configured to transmit the driving force from the other driver source 12 separately to the first transmission portion 61 and to the second transmission portion 62.

The speed-shifting portion 63 includes the sun gears 68 and 98 connected to the dividing transmission portion 66, the planetary gears 67 and 97 engaged with the sun gears 68 and 98 and configured to transmit the driving force to the first rotor 810 or the second rotor 820, and the inner gears 69 and 99 having the internal teeth engaged with the planetary gears 67 and 97 and the external teeth to which the driving force from the driver source 64 is transmitted.

The speed-shifting portion 63 includes the first speed-shifting portion 631 provided in the first transmission portion 61 and the second speed-shifting portion 632 provided in the second transmission portion 62. The driver source 64 includes the first motor 641 included in the first speed-shifting portion 631 and includes the second motor 642 included in the second speed-shifting portion 632.

In addition, the third spreader device includes the attachment portion (the frame) 9 configured to can be attached to the traveling vehicle 3. The other driver source 12 is an internal combustion engine provided in the traveling vehicle 3. The driving force of the other driver source 12 is transmitted to the dividing transmission portion 66 through the PTO shaft 13 of the traveling vehicle 3.

Next, a specific configuration of the third spreader device will be described.

As described above, the configuration of the third spreader device other than the driver portion 10 is similar to the configuration of the spreader device 2 according to the above-described embodiment. Thus, the specific configuration of the driver portion 10 of the third spreader device will be described based on FIG. 11.

In the driver portion 10 of the third spreader device, the driver source 64 is an electric motor. As shown in FIG. 1, the other driver source 12 is an internal combustion engine provided in the traveling vehicle 3, specifically an engine, and preferably a diesel engine.

The driving force of the other driver source (the engine) 12 is transmitted to the PTO shaft 13 of the traveling vehicle 3. One end side of the transmission shaft 71 is connected to the PTO shaft 13 through a connecting portion 91 such as a shaft coupler. The other end of the transmission shaft 71 is connected to the dividing transmission portion 66. The transmission shaft 71 transmits, to the dividing transmission portion 66, the driving force outputted from the PTO shaft 13.

The dividing transmission portion 66 transmits the driving force from the other driver source 12 (the driving force transmitted from the transmission shaft 71) separately to one and the other. The dividing transmission portion 66 includes the first transmission gear 72, the second transmission gear 73, the one transmission shaft 74, and the other transmission shaft 75.

The other end side of the transmission shaft 71 is connected to the center of the first transmission gear 72. The second transmission gear 73 is engaged with the first transmission gear 72. The gears (the first transmission gear 72 and the second transmission gear 73) constituting the dividing transmission portion 66 are both bevel gears. The direction of the rotation axis of the first transmission gear 72 intersects (orthogonally) with the direction of the rotation axis of the second transmission gear 73.

One end side of one transmission shaft 74 and one end side of the other transmission shaft 75 are connected to the second transmission gear 73, respectively. The one transmission shaft 74 and the other transmission shaft 75 extend from the center of the second transmission gear 73 toward opposite sides.

In this manner, the driving force transmitted from the transmission shaft 71 to the dividing transmission portion 66 is transmitted from the second transmission gear 73 separately to the one transmission shaft 74 (*one*) and the other transmission shaft 75 (the other) in the dividing transmission portion 66.

The first transmission portion 61 transmits, to the first rotor 810, the driving force transmitted from the dividing transmission portion 66 to one side (the one transmission shaft 74). The first transmission portion 61 includes the first speed-shifting portion 631, the first output shaft 76, the third transmission gear 77, and the fourth transmission gear 78.

The first speed-shifting portion 631 includes the first motor 641. The first speed-shifting portion 631 changes the rotating speed of the first rotor 810 according to the speed-shifting of the first motor 641. The first speed-shifting portion 631 includes the drive gear 79 and the planetary gear mechanism 90.

The drive gear 79 is connected to the first motor 641, and rotates in synchronization with the driving of the first motor 641.

The planetary gear mechanism 90 includes the sun gear 68, the planetary gear 67, the planetary carrier 70, and the inner gear 69.

The sun gear 68 is engaged with the planetary gear 67. The planetary gear 67 is rotatably supported by the planetary carrier 70, and is configured to rotate (revolve) around the sun gear 68. The planetary carrier 70 rotates in synchronization with the rotating (revolving) of the planetary gear 67. The other end of the one transmission shaft 74 is connected to the sun gear 68. In this manner, the sun gear 68 is connected to the dividing transmission portion 66 through the one transmission shaft 74. The inner gear 69 has the internal teeth formed on the inner peripheral surface and the external teeth formed on the outer peripheral surface. The internal teeth are engaged with the planetary gear 67. The external teeth are engaged with the drive gear 79.

One end side of the first output shaft 76 is connected to the planetary carrier 70. The other end side of the first output shaft 76 is connected to the third transmission gear 77. The fourth transmission gear 78 is engaged with the third transmission gear 77. The third transmission gear 77 and the fourth transmission gear 78 are both bevel gears. The direction of the rotation axis of the third transmission gear 77 intersects (orthogonal) with the direction of the rotation axis of the fourth transmission gear 78. The center of the fourth transmission gear 78 is connected to the center axis of the first rotor 810. In this manner, the rotational driving force of the fourth transmission gear 78 is transmitted to the first rotor 810. That is, the rotational driving force of the planetary gear 67 (the planetary carrier 70) is transmitted to the first rotor 810 through the first output shaft 76, the third transmission gear 77, and the fourth transmission gear 78.

The second transmission portion 62 transmits, to the second rotor 820, the driving force transmitted from the dividing transmission portion 66 to the other (the other transmission shaft 75). The second transmission portion 62 includes the second speed-shifting portion 632, the second output shaft 92, the fifth transmission gear 93, and the sixth transmission gear 94.

The second speed-shifting portion 632 includes the second motor 642. The second speed-shifting portion 632 changes the rotating speed of the second rotor 820 according to the speed shifting of the second motor 642. The second speed-shifting portion 632 includes the drive gear 95 and the planetary gear mechanism 96.

The drive gear 95 is connected to the second motor 642 and is configured to rotate in synchronization with the driving of the second motor 642.

The planetary gear mechanism 96 has the sun gear 98, the planetary gear 97, the planetary carrier 100, and the inner gear 99.

The sun gear 98 is engaged with the planetary gear 97. The planetary gear 97 is rotatably supported by the planetary carrier 100, and is configured to rotate (revolve) around the sun gear 98. The planetary carrier 100 rotates in synchronization with the rotating (the revolving) of the planetary gear 97. The other end side of the other transmission shaft 75 is connected to the sun gear 98. In this manner, the sun gear 98 is connected to the dividing transmission portion 66 through the other transmission shaft 75. The inner gear 99 has the internal teeth formed on the inner peripheral surface and the external teeth formed on the outer peripheral surface. The internal teeth are engaged with the planetary gear 97. The external teeth are engaged with the drive gear 95.

One end side of the second output shaft 92 is connected to the planetary carrier 100. The other end side of the second output shaft 92 is connected to the fifth transmission gear 93. The sixth transmission gear 94 is engaged with the fifth transmission gear 93. The fifth transmission gear 93 and the sixth transmission gear 94 are both bevel gears. The direction of the rotation axis of the fifth transmission gear 93 intersects (orthogonal) with the direction of the rotation axis of the sixth transmission gear 94. The center of the sixth transmission gear 94 is connected to the center axis of the second rotor 820. In this manner, the rotational driving force of the sixth transmission gear 94 is transmitted to the second rotor 820. That is, the rotational driving force of the planetary gear 97 (the planetary carrier 100) is transmitted to the second rotor 820 through the second output shaft 92, the fifth transmission gear 93, and the sixth transmission gear 94.

Hereinafter, an operation (an action) of the driver portion 10 of the third spreader device will be described.

The driving force outputted from the other driver source (the engine) 12 is transmitted to the dividing transmission portion 66 through the PTO shaft 13, the connecting portion 91, and the transmission shaft 71.

The dividing transmission portion 66 transmits the driving force transmitted from the transmission shaft 71 separately to one side (the one transmission shaft 74) and the other side (the other transmission shaft 75). That is, the dividing transmission portion 66 transmits the driving force outputted from the other driver source 12 separately to the one side and the other side.

The driving force transmitted from the dividing transmission portion 66 to the one side (the one transmission shaft 74) is transmitted to the first rotor 810 through the first transmission portion 61. In particular, the sun gear 68 is rotated by the driving force transmitted to the one transmission shaft 74, and the planetary gear 67 and the planetary carrier 70 are rotated in synchronization with the rotating of the sun gear 68. The rotational driving forces of the planetary gear 67 and the planetary carrier 70 are transmitted to the first rotor 810 through the first output shaft 76, the third transmission gear 77, and the fourth transmission gear 78.

The driving force transmitted from the dividing transmission portion 66 to the other (the other transmission shaft 75) is transmitted to the second rotor 820 through the second transmission portion 62. In particular, the sun gear 98 is rotated by the driving force transmitted to the other transmission shaft 75, and the planetary gear 97 and the planetary carrier 100 are rotated in synchronization with the rotating of the sun gear 98. The rotational driving forces of the planetary gear 97 and the planetary carrier 100 are transmitted to the second rotor 820 through the second output shaft 92, the fifth transmission gear 93, and the sixth transmission gear 94.

Accordingly, the first rotor 810 and the second rotor 820 can be rotated by the driving force outputted from the other driver source 12.

Next, the operation of the speed-shifting portion 63 will be described.

First, the operation of the first speed-shifting portion 631 will be described.

When the first motor 641 that is the driver source 64 of the first speed-shifting portion 631 is driven, the driving force from the first motor 641 is transmitted to the external teeth of the inner gear 69 through the drive gear 79. Thus, when the first motor 641 is driven, the inner gear 69 rotates. The rotating of the inner gear 69 is transmitted to the planetary gear 67 through the internal teeth of the inner gear 69, and thus the planetary gear 67 and the planetary carrier 70 rotate. The rotating of the planetary gear 67 and the planetary carrier 70 is transmitted to the first rotor 810 through the first output shaft 76, the third transmission gear 77, and the fourth transmission gear 78.

As described above, the driving force from the first speed-shifting portion 631 including the first motor 641 is transmitted to the first rotor 810. In this manner, the rotating speed of the first rotor 810 can be changed according to the speed shifting of the first motor 641. In other words, the driver source 64 (the first motor 641) of the first speed-shifting portion 631 is configured to apply the rotation driving force to a passage for transmitting the driving force to the first rotor 810 and thereby to change the rotating speed of the first rotor 810.

Next, the operation of the second speed-shifting portion 632 will be described.

When the second motor 642 that is the driver source 64 of the second speed-shifting portion 632 is driven, the driving force from the second motor 642 is transmitted to the external teeth of the inner gear 99 through the drive gear 95. Thus, when the second motor 642 is driven, the inner gear 99 rotates. The rotating of the inner gear 99 is transmitted to the planetary gear 97 through the internal teeth of the inner gear 99, and thus the planetary gear 97 and the planetary carrier 100 rotate. The rotating of the planetary gear 97 and the planetary carrier 100 is transmitted to the second rotor 820 through the second output shaft 92, the fifth transmission gear 93, and the sixth transmission gear 94.

As described above, the driving force from the second speed-shifting portion 632 including the second motor 642 is transmitted to the second rotor 820. In this manner, the rotating speed of the second rotor 820 can be changed according to the speed shifting or the second motor 642. In other words, the driver source 64 (the second motor 642) of the second speed-shifting portion 632 is configured to apply the rotation driving force to a passage for transmitting the driving force to the second rotor 820 and thereby to change the rotating speed of the second rotor 820.

As described above, the first speed-shifting portion 631 can change the rotating speed of the first rotor 810, and the second speed-shifting portion 632 can change the rotating speed of the second rotor 820. In this manner, the rotating speed of the first rotator 810 and the rotating speed of the second rotator 820 can be made different as necessary.

In addition, the first rotor 810 and the second rotor 820 can be driven with use of two inputs, an input from the PTO shaft 13 that rotates in synchronization with the engine (the other driver source) 12 and an input from the motor (the first motor 641, the second motor 642). In this manner, the rotating speeds of the first rotor 810 and the second rotor 820 can be changed by changing the rotating speed of the engine 12, and further the rotating speeds of the first rotor 810 and the second rotor 820 can be changed by changing the rotating speed of the motor.

In addition, the rotating speeds of the first rotor 810 and the second rotor 820 can be changed while the rotating speed of the PTO shaft 13 is kept constant. In this manner, the optimal spreading according to the shape of the agricultural field and the position of the spreader device 2 can be realized without changing the rotating speed of the engine 12 (without changing the speed of the traveling vehicle 3). In addition, in a state in which the rotating speed of the engine 12 is optimized and kept at a constant rotating speed (for example, a state in which the rotating speed is kept at a low rotating speed), the rotating speeds of the first rotor 810 and the second rotor 820 can be changed by the motors (the first motor 641 and the second motor 642), and thus the fuel consumption can be improved.

Even when the rotating speeds of the engine 12 and the PTO shaft 13 fluctuate, the rotating speeds of the first rotational body 810 and the second rotational body 820 are kept constant by controlling to change the rotating speeds of the first motor 641 and the second motor 642. In addition, the control of the rotating speeds of the first motor 641 and the second motor 642 can be performed by the control portion (ECU: Electric Control Unit) with which the traveling vehicle 3 and/or the spreader device 2 are provided. Based on the rotating speeds of the first rotor 810 and the second rotor 820 set according to the shape of the agricultural field and the position of the spreader device 2 and on the actual rotating speeds of the engine 12 and the PTO shaft 13, the control portion can control the rotating speeds of the first motor 641 and the second motor 642 independently.

In the above description, the embodiment of the present invention has been explained. However, all the features of the embodiment disclosed in this application should be considered just as examples, and the embodiment does not restrict the present invention accordingly. A scope of the present invention is shown not in the above-described embodiment but in claims, and is intended to include all modifications within and equivalent to a scope of the claims.

What is claimed is:

1. A spreader device comprising:
   a container to contain spread substance;
   a first spreader portion having a first rotor to spray the spread substance contained in the container;
   a second spreader portion having a second rotor to spray the spread substance contained in the container;
   a first driver source to drive the first rotor;
   a first shaft to transmit a driving force outputted from the first driver source;
   a second shaft to transmit a driving force outputted from a second driver source different from the first driver source; and
   a selection transmitter portion to selectively transmit the driving force from the first shaft and the driving force from the second shaft to the first rotor or the second rotor,
   wherein the selection transmitter portion includes a clutch and is configured to be switched between a first state to be connected to the first shaft and a second state to be connected to the second shaft, the selection transmitter portion being configured to allow the driving force from the first shaft to be transmitted to the second rotor when in the first state, and allow the driving force from the second shaft to be transmitted to the second rotor when in the second state.

2. The spreader device according to claim 1, comprising an attachment portion attached to a traveling vehicle,
   wherein the first driver source is a motor,
   wherein the second driver source is an internal combustion engine provided to the traveling vehicle,
   and wherein the driving force of the second driver source is transmitted to the second shaft through a PTO shaft of the traveling vehicle.

3. The spreader device according to claim 1,
   wherein the selection transmitter portion is configured to receive the driving force from the first shaft and the driving force from the second shaft and to selectively transmit, to the second rotor, the driving force from the first shaft and the driving force from the second shaft.

4. The spreader device according to claim 1, comprising:
   a first driving force transmission portion to transmit the driving force provided from the first driver source;
   a second driving force transmission portion to transmit the driving force to the first rotor; and
   a driving force transmission mechanism configured to receive the driving force transmitted from the first driving force transmission portion and the driving force transmitted from the second shaft and to transmit the received driving forces to the second driving force transmission portion and the selection transmitter portion.

5. The spreader device according to claim 4,
   wherein the driving force transmission mechanism is configured to:
      change a rotating speed of the second rotor in synchronization with changing of a revolving speed of the first driver source when the selection transmitter portion is in the first state; and
      change a rotating speed of the first rotor in synchronization with changing of the revolving speed of the first driver source when the selection transmitter portion is in the second state.

6. The spreader device according to claim 1, comprising:
   a first driving force transmission portion to transmit the driving force provided from the first driver source;
   a second driving force transmission portion to transmit the driving force from the first driver source or the driving force from the second driver source to the first rotor;
   a third driving force transmission portion to transmit the driving force from the first driver source or the driving force from the second driver source to the second rotor; and
   a driving force transmission mechanism configured to receive the driving force transmitted from the first driving force transmission portion and the driving force transmitted from the second shaft and to transmit the received driving forces to the second driving force transmission portion and the third driving force transmission portion.

7. The spreader device according to claim 6,
   wherein the selection transmitter portion is switched between
      an allowing state to allow the driving force to be transmitted between the second driving force transmission portion and the third driving force transmission portion, and
      a blocking state to block the driving force from being transmitted between the second driving force transmission portion and the third driving force transmission portion.

* * * * *